US011560136B2

(12) United States Patent
Kurihashi et al.

(10) Patent No.: US 11,560,136 B2
(45) Date of Patent: Jan. 24, 2023

(54) CONTROL DEVICE

(71) Applicant: TOYOTA JIDOSHA KABUSHIKI KAISHA, Toyota (JP)

(72) Inventors: Sui Kurihashi, Susono (JP); Yoshihiro Sakayanagi, Mishima (JP); Yoshiyuki Kageura, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 302 days.

(21) Appl. No.: 16/284,018

(22) Filed: Feb. 25, 2019

(65) Prior Publication Data
US 2019/0270443 A1 Sep. 5, 2019

(30) Foreign Application Priority Data

Mar. 2, 2018 (JP) .............................. JP2018-037990
Sep. 21, 2018 (JP) .............................. JP2018-178140

(51) Int. Cl.
*B60W 20/15* (2016.01)
*B60L 50/61* (2019.01)
(Continued)

(52) U.S. Cl.
CPC ............ *B60W 20/15* (2016.01); *B60K 6/365* (2013.01); *B60K 6/445* (2013.01); *B60L 50/61* (2019.02);
(Continued)

(58) Field of Classification Search
CPC ...... B60W 20/15; B60W 20/12; B60W 20/16; B60W 10/06; B60W 10/08; B60W 10/26;
(Continued)

(56) References Cited

U.S. PATENT DOCUMENTS 10,118,606 B2 * 11/2018 Ogawa ................. B60W 20/40
2008/0305922 A1 * 12/2008 Hoffmann ............... B60K 6/24
477/3
(Continued)

FOREIGN PATENT DOCUMENTS

CN 104071150 A 10/2014
CN 105674994 A * 6/2016
(Continued)

OTHER PUBLICATIONS

U.S. Appl. No. 16/535,167, filed Aug. 8, 2019.
(Continued)

*Primary Examiner* — Maceeh Anwari
(74) *Attorney, Agent, or Firm* — Finnegan, Henderson, Farabow, Garrett & Dunner, LLP

(57) ABSTRACT

A control device for a hybrid vehicle is provided with a driving plan preparing part preparing a driving plan setting one or more via-points on a projected route from a starting point to a destination to divide the projected route into a plurality of driving routes and divide the driving routes further into pluralities of driving sections and setting which driving mode of an EV mode or HV mode to drive over in each driving section and with a driving mode switching part switching the driving modes according to a driving plan. The driving plan preparing part is configured to be able to prepare a driving plan setting the driving modes of all driving sections in at least one driving route to the EV mode.

9 Claims, 29 Drawing Sheets

(51) Int. Cl.
  *B60W 10/06* (2006.01)
  *B60W 10/08* (2006.01)
  *B60W 10/26* (2006.01)
  *F01N 3/20* (2006.01)
  *B60W 30/182* (2020.01)
  *B60K 6/365* (2007.10)
  *B60W 20/16* (2016.01)
  *B60W 20/12* (2016.01)
  *B60W 50/00* (2006.01)
  *B60K 6/445* (2007.10)

(52) U.S. Cl.
  CPC ............ *B60W 10/06* (2013.01); *B60W 10/08* (2013.01); *B60W 10/26* (2013.01); *B60W 20/12* (2016.01); *B60W 20/16* (2016.01); *B60W 30/182* (2013.01); *B60W 50/0097* (2013.01); *F01N 3/2013* (2013.01); *B60L 2240/445* (2013.01); *B60W 2510/068* (2013.01); *B60W 2556/50* (2020.02)

(58) Field of Classification Search
  CPC ........... B60W 30/182; B60W 50/0097; B60W 2556/50; B60W 2510/068; B60L 50/61; B60L 2240/445; B60K 6/365; B60K 6/445
  USPC .......................................................... 701/22
  See application file for complete search history.

(56) References Cited

U.S. PATENT DOCUMENTS

| | | | |
|---|---|---|---|
| 2010/0004314 A1 | 1/2010 | Dondero et al. | |
| 2010/0043414 A1 | 2/2010 | Hirose | |
| 2012/0150374 A1 | 6/2012 | Yamazaki et al. | |
| 2014/0288743 A1 | 9/2014 | Hokoi et al. | |
| 2015/0298687 A1 | 10/2015 | Kanno et al. | |
| 2017/0043761 A1 | 2/2017 | Morisaki | |
| 2017/0066431 A1 | 3/2017 | Kim et al. | |
| 2020/0094812 A1 | 3/2020 | Kurihashi | |
| 2020/0182118 A1 | 6/2020 | Yokoi | |

FOREIGN PATENT DOCUMENTS

| | | | | |
|---|---|---|---|---|
| CN | 106232447 A | 12/2016 | | |
| CN | 107387213 A | 11/2017 | | |
| EP | 2 808 218 A1 | 12/2014 | | |
| EP | 2 910 444 A1 | 8/2015 | | |
| JP | 2012111381 A | * 6/2012 | | |
| JP | 2013-159214 A | 8/2013 | | |
| JP | 2014-080190 A | 5/2014 | | |
| JP | 2014-162261 | 9/2014 | | |
| JP | 2016-008517 A | 1/2016 | | |
| JP | 2016-088128 A | 5/2016 | | |
| JP | 2016-113946 A | 6/2016 | | |
| JP | 2016-196256 A | 11/2016 | | |
| WO | WO-2011024038 A2 | * 3/2011 | ............ | B60K 6/445 |
| WO | WO2015/045261 A1 | 4/2015 | | |
| WO | WO2015/124983 A1 | 8/2015 | | |
| WO | WO2015/162474 A1 | 10/2015 | | |
| WO | WO-2015162474 A1 | * 10/2015 | ............ | B60W 20/13 |

OTHER PUBLICATIONS

Office Action issued in U.S. Appl. No. 16/535,167 dated Feb. 4, 2022.

Notice of Allowance issued in U.S. Appl. No. 16/535,167 dated Aug. 12, 2022.

Corrected Notice of Allowability issued in U.S. Appl. No. 16/535,167 dated Aug. 30, 2022.

* cited by examiner

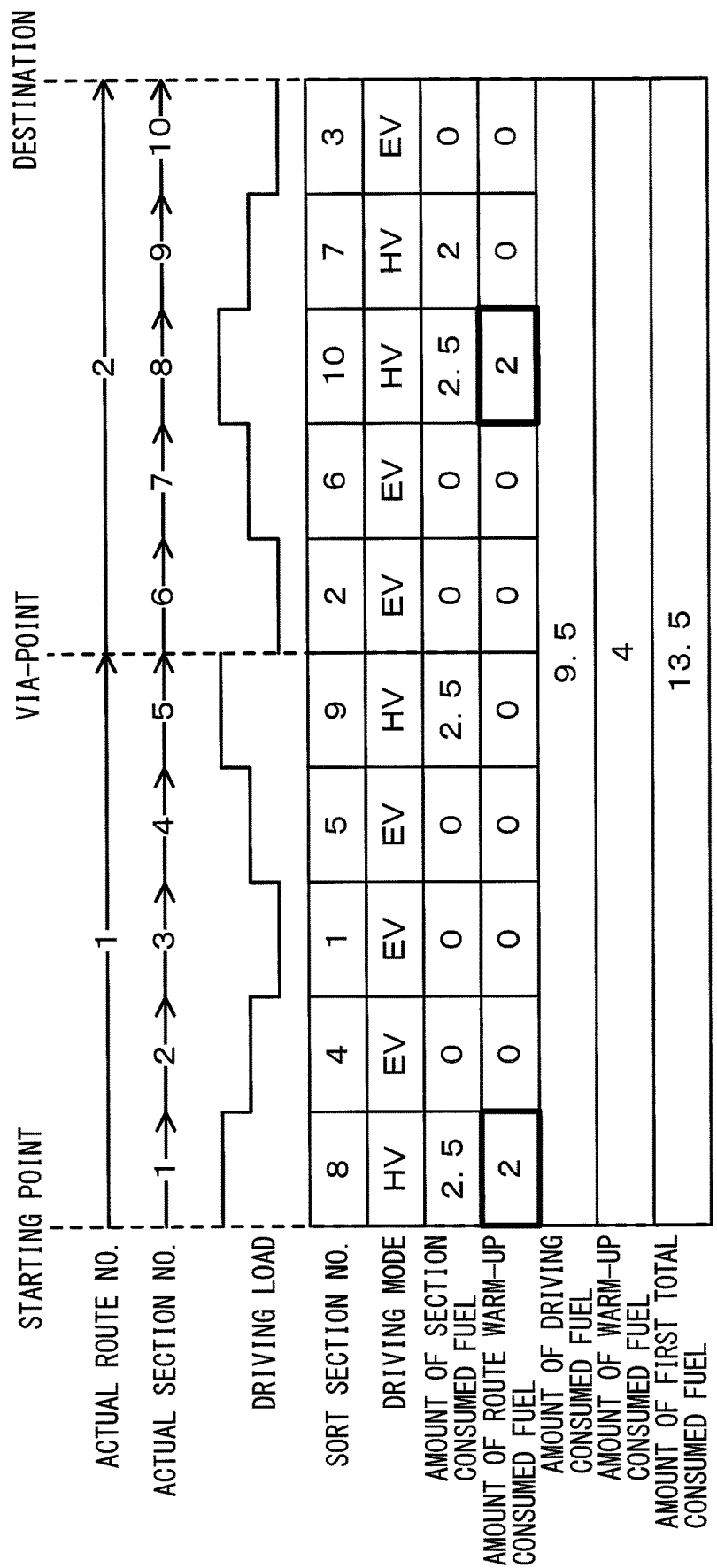

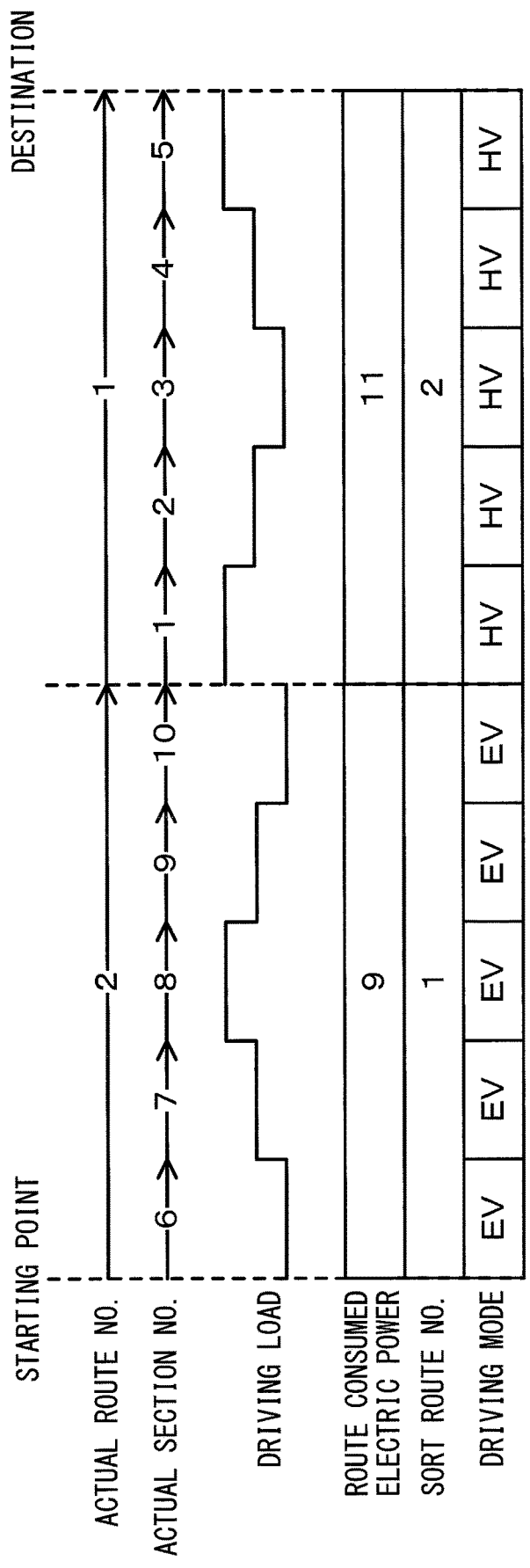

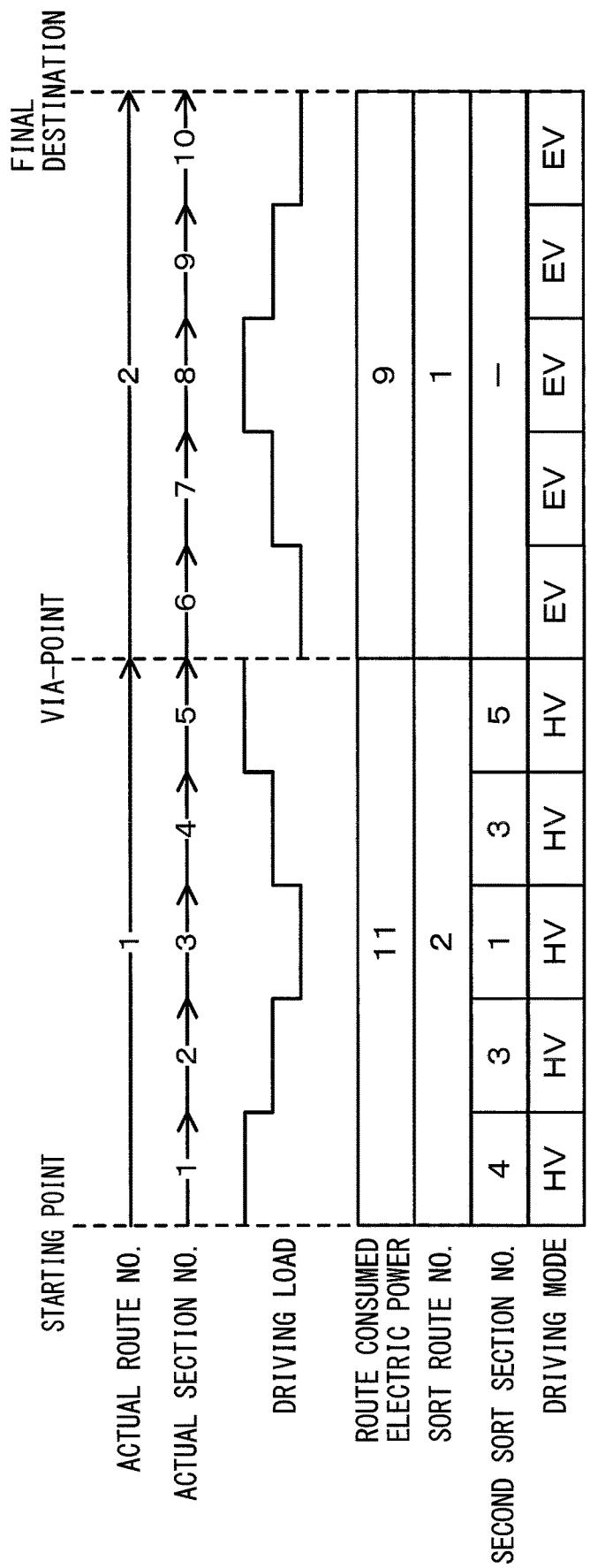

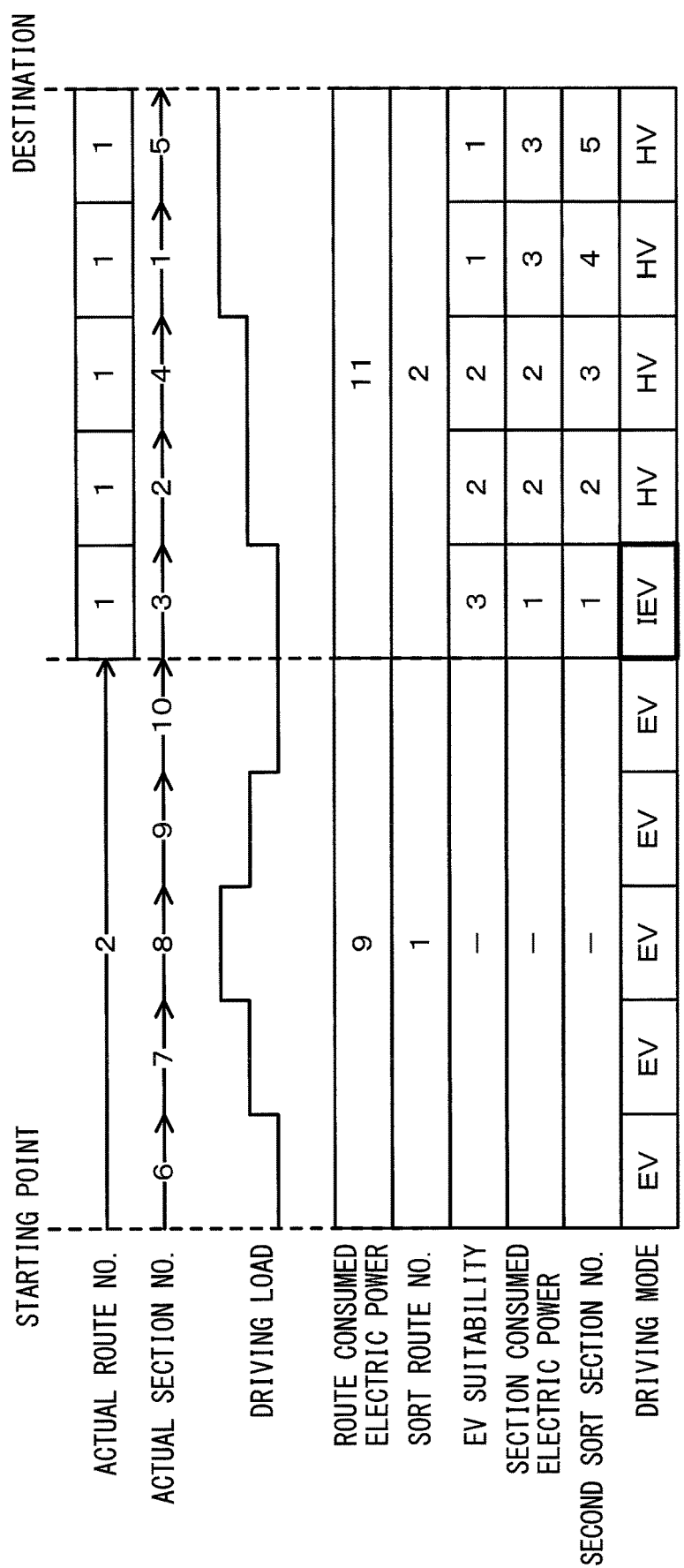

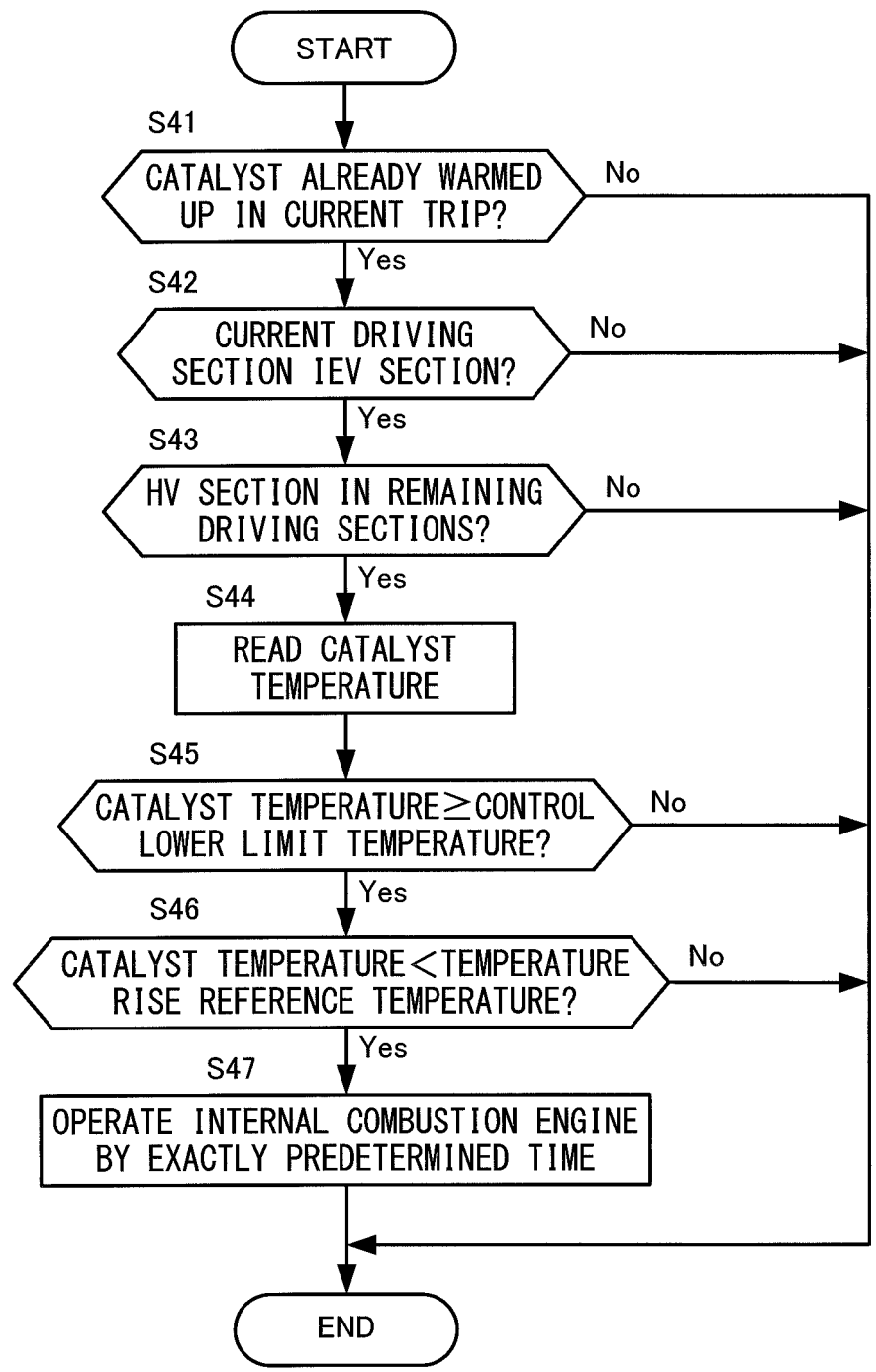

CONTROL DEVICE

CROSS-REFERENCE TO RELATED APPLICATION

This application claims priority based on Japanese Patent Application No. 2018-037990 filed with the Japan Patent Office on Mar. 2, 2018, and Japanese Patent Application No. 2018-178140 filed with the Japan Patent Office on Sep. 21, 2018, the entire contents of which are incorporated into the present specification by reference.

FIELD

The present disclosure relates to a control device for a hybrid vehicle.

BACKGROUND

Japanese Unexamined Patent Publication No. 2014-162261A discloses a conventional control device of a hybrid vehicle configured so as to prepare a driving plan dividing a projected route up to a destination into a plurality of sections and classifying the sections into EV sections of driving by an EV mode and HV sections of driving by an HV mode.

SUMMARY

However, the above-mentioned conventional control device for a hybrid vehicle did not consider the amount of fuel required for warming up an exhaust purification catalyst of an internal combustion engine when preparing the driving plan. For this reason, when driving the vehicle in accordance with the driving plan, the number of times of warming up the catalyst increased and the fuel efficiency was liable to deteriorate.

The present disclosure was made in consideration of such a problem and has as its object to keep down the number of times of warming up a catalyst so as to keep down the amount of fuel consumed for warming up the catalyst.

To solve the above problem, according to one aspect of the present disclosure, there is provided a control device of a hybrid vehicle for controlling a hybrid vehicle provided with an internal combustion engine, a rechargeable battery, and a rotary electric machine driven by electric power of the battery, the control device comprising a driving plan preparing part preparing a driving plan setting one or more via-points on a projected route from a starting point to a destination to divide that projected route into a plurality of driving routes and further divide the driving routes to pluralities of driving sections and setting the driving sections to be driven over by either driving mode of an EV mode of driving using electric power of the battery as a main power supply or an HV mode of driving using the internal combustion engine as a main power supply and comprising a driving mode switching part switching the driving modes in accordance with the driving plan. The driving plan preparing part is configured to be able to prepare a driving plan setting the driving modes of all driving sections in at least one driving route to the EV mode.

According to this aspect of the present disclosure, it is possible to keep down the number of times of warming up a catalyst and keep down the amount of fuel consumed for warming up the catalyst.

BRIEF DESCRIPTION OF DRAWINGS

FIG. 3C is a figure for explaining preparation of the first driving plan optimizing driving of one trip.

FIG. 4B is a view explaining the preparation of the second driving plan according to the first embodiment of the present disclosure optimizing a plurality of trips.

FIG. 6C is a view explaining the preparation of the second driving plan according to the second embodiment of the present disclosure optimizing a plurality of trips.

FIG. 8A is a view explaining the preparation of the second driving plan according to a third embodiment of the present disclosure optimizing a plurality of trips.

FIG. 9 is a flow chart explaining catalyst temperature rise control according to the third embodiment of the present disclosure.

DESCRIPTION OF EMBODIMENTS

Figure 1:
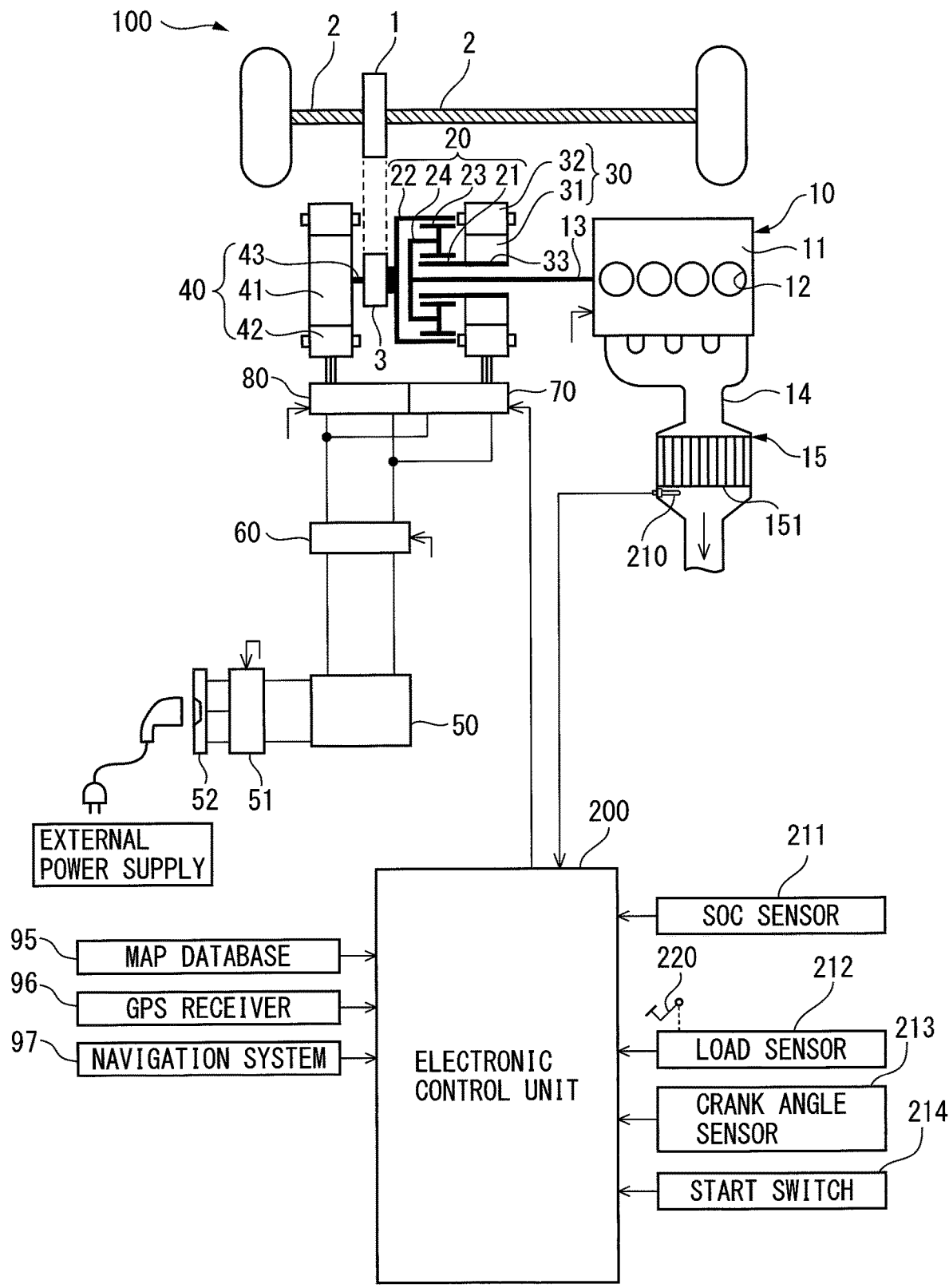
FIG. 1 is a schematic view of the configuration of a vehicle and an electronic control unit controlling the vehicle according to a first embodiment of the present disclosure.

Below, referring to the drawings, embodiments of the present disclosure will be explained in detail. Note that, in the following explanation, similar component elements are assigned the same reference numerals.

First Embodiment

FIG. 1 is a schematic view of the configuration of a vehicle 100 and an electronic control unit 200 controlling the vehicle 100 according to a first embodiment of the present disclosure.

The vehicle 100 according to the present embodiment is a hybrid vehicle provided with an internal combustion engine 10, power dividing mechanism 20, first rotary electric machine 30, second rotary electric machine 40, battery 50, boost converter 60, first inverter 70, and second inverter 80 and is configured to be able to transmit the power of one or both of the internal combustion engine 10 and second rotary electric machine 40 through a final reduction gear 1 to wheel drive shaft 2. Further, the vehicle 100 is provided with, in addition to the internal combustion engine 10, a map database 95, GPS receiver 96, and navigation system 97.

The internal combustion engine 10 makes fuel burn inside a cylinder 12 formed in an engine body 11 to cause generation of power for making an output shaft 13 connected with a crankshaft rotate. Exhaust discharged from the cylinder 12 to an exhaust passage 14 flows through the exhaust passage 14 and is discharged into the atmosphere. At the exhaust passage 14, a catalyst device 15 is provided for removing harmful substances from the exhaust. The catalyst device 15 is, for example, comprised of a honeycomb shaped substrate 151 carrying an oxidation catalyst or three-way catalyst or other catalyst having an exhaust purification function (exhaust purification catalyst) on its surface. Downstream of the substrate 151, a catalyst temperature sensor 210 is provided for detecting the catalyst temperature.

The power division mechanism 20 is a planetary gear for dividing the power of the internal combustion engine 10 into two systems of the power for turning the wheel drive shaft 2 and power for driving the first rotary electrical machine 30 in a regeneration mode and is provided with a sun gear 21, ring gear 22, pinion gears 23, and a planetary carrier 24.

The sun gear 21 is an external gear and is arranged at the center of the power division mechanism 20. The sun gear 21 is connected with a shaft 33 of the first rotary electrical machine 30.

The ring gear 22 is an internal gear and is arranged around the sun gear 21 so as to become concentric with the sun gear 21. The ring gear 22 is connected with a shaft 33 of the second rotary electrical machine 40. Further, the ring gear 22 has integrally attached to it a drive gear 3 for transmitting rotation of the ring gear 22 to the wheel drive shaft 2 through the final deceleration device 1.

A pinion gear 23 is an external gear. A plurality are arranged between the sun gear 21 and ring gear 22 so as to mesh with the sun gear 21 and ring gear 22.

The planetary carrier 24 is connected to the output shaft 13 of the internal combustion engine 10 and rotates about the output shaft 13. Further, the planetary carrier 24 is also connected to the pinion gears 23 so as to enable the pinion gears 23 to revolve (orbit) around the sun gear 21 while individually rotating on their axes when the planetary carrier 24 rotates.

The first rotary electrical machine 30 is, for example, a three-phase AC synchronous type motor-generator and is provided with a rotor 31 attached to the outer circumference of the shaft 33 coupled with the sun gear 21 and having a plurality of permanent magnets embedded in its outer circumference and a stator 32 around which is wound an excitation coil generating a rotating magnetic field. The first rotary electrical machine 30 has the function of a motor receiving the supply of power from the battery 50 and being driven in a power running mode and the function of a generator receiving power from the internal combustion engine 10 and being driven in a regeneration mode.

In the present embodiment, the first rotary electrical machine 30 is mainly used as a generator. Further, when making the output shaft 13 rotate for cranking at the time of startup of the internal combustion engine 10, it is used as a motor and plays the role of a starter.

The second rotary electrical machine 40 is, for example, a three-phase AC synchronous type motor-generator. It is provided with a rotor 41 attached to the outer circumference of the shaft 43 connected to the ring gear 22 and having a plurality of permanent magnets embedded in its outer circumferential part and with a stator 42 around which an excitation coil generating a rotating magnetic field is wound. The second rotary electrical machine 40 has the function as a motor receiving the supply of power from a battery 50 and being driven in a power running mode and the function as a generator receiving power from the wheel drive shaft 2 and being driven in a regeneration mode at the time of deceleration of the vehicle etc.

The battery 50 is, for example, a nickel-cadmium storage battery or nickel-hydrogen storage battery, lithium ion battery, or other rechargeable secondary battery. In the present embodiment, as the battery 50, a lithium ion secondary battery with a rated voltage of 200V or so is used. The battery 50 is electrically connected through a boost converter 60 etc. to the first rotary electrical machine 30 and second rotary electrical machine 40 so as to enable charged power of the battery 50 to be supplied to the first rotary electrical machine 30 and second rotary electrical machine 40 and drive them in the power running mode and, further, so as to enable the generated power of the first rotary electrical machine 30 and second rotary electrical machine 40 to charge the battery 50.

Furthermore, the battery 50 is, for example, configured to be able to be electrically connected to an external power supply through a charging control circuit 51 and a charging lid 52 so that charging from a household power outlet or other external power supply becomes possible. The vehicle 100 according to the present embodiment is made a so-called "plug-in hybrid vehicle". The charging control circuit 51 is an electrical circuit able to convert AC current supplied from the external power supply to DC current based on a control signal from the electronic control unit 200 and boost the input voltage to the battery voltage to charge the electric power of the external power supply to the battery 50.

The boost converter 60 is provided with an electrical circuit boosting the terminal voltage of the primary side terminal and outputting it from the secondary side terminal based on a control signal from the electronic control unit 200 and conversely lowering the terminal voltage of the secondary side terminal and outputting it from the primary side terminal based on a control signal from the electronic control unit 200. The primary side terminal of the boost converter 60 is connected to the output terminal of the battery 50, while the secondary side terminal is connected to the DC side terminals of the first inverter 70 and second inverter 80.

The first inverter 70 and second inverter 80 are provided with electrical circuits enabling them to convert direct currents input from the DC side terminals to alternating currents (in the present embodiment, three-phase alternating currents) and output them from the AC side terminals based on a control signal from the electronic control unit 200 and conversely to convert alternating currents input from the AC side terminals to direct currents and output them from the DC side terminals based on a control signal of the electronic control unit 200. The DC side terminal of the first inverter 70 is connected to the secondary side terminal of the boost converter 60, while the AC side terminal of the first inverter 70 is connected to the input/output terminal of the first rotary electrical machine 30. The DC side terminal of the second inverter 80 is connected to the secondary side terminal of the boost converter 60, while the AC side terminal of the second inverter 80 is connected to the input/output terminal of the second rotary electrical machine 40.

The map database 95 is a database relating to the map information. This map database 95, for example, is stored in a hard disk drive (HDD) mounted in the vehicle. The map information contains positional information of the roads and information on the road shape (for example, gradients, types of curves/straight parts, curvatures of the curves, etc.), positional information of intersections and branching points, road types, speed limits, and various other road information.

The GPS receiver 96 receives signals from three or more GPS satellites to identify a longitude and latitude of the vehicle 100 and detect a current position of the vehicle 100. The GPS receiver 96 transmits the detected current position information of the vehicle 100 to the electronic control unit 200.

The navigation system 97 sets a projected route of the vehicle based on the current position information of the vehicle 100 detected by the GPS receiver 96 or map information of the map database 95, destination which the driver sets, etc. and transmits information relating to the set projected route as navigation information to the electronic control unit 200.

The electronic control unit 200 is a microcomputer provided with components connected with each other by a bidirectional bus such as a central processing unit (CPU), read only memory (ROM), random access memory (RAM), input port, and output port.

The electronic control unit 200 receives as input output signals from various sensors such as an SOC sensor 211 detecting the battery charging amount or a load sensor 212 generating an output voltage proportional to an amount of depression of an accelerator pedal 220, crank angle sensor 213 generating as a signal for calculating the engine rotational speed etc. an output pulse each time a crankshaft of the engine body 11 rotates by for example 15°, and a start switch 214 for judging starting and stopping of the vehicle 100.

The electronic control unit 200 drives the control components to control the vehicle 100 based on the output signals of the various sensors which are input etc. Below, the control of the vehicle 100 according to the present embodiment which the electronic control unit 200 performs will be explained.

The electronic control unit 200 switches the driving mode to either of an EV (electric vehicle) mode or HV (hybrid vehicle) mode to drive the vehicle 100.

The EV mode is a mode in which the charged electric power of the battery 50 is utilized on a priority basis to drive operation of the second rotary electric machine 40 and the power of at least the second rotary electric machine 40 is transmitted to the wheel drive shaft 2 to drive the vehicle 100.

When the driving mode is the EV mode, in the state making the internal combustion engine 10 stop, the electronic control unit 200 basically uses the charged electric power of the battery 50 to drive the second rotary electric machine 40 by powered operation and uses only the power of the second rotary electric machine 40 to make the wheel drive shaft 2 rotate to drive the vehicle 100.

On the other hand, the HV mode is a mode in which the internal combustion engine 10 is operated and the generated electric power of the first rotary electric machine 30 is utilized on a priority basis to drive the second rotary electric machine 40 by powered operation and the power of both the internal combustion engine 10 and the second rotary electric machine 40 is transmitted to the wheel drive shaft 2 to drive the vehicle 100.

When the driving mode is the HV mode, the electronic control unit 200 divides the power of the internal combustion engine 10 into two systems by the power dividing mechanism 20, transmits one divided power of the internal combustion engine 10 to the wheel drive shaft 2, and uses the other power to drive the first rotary electric machine 30 by regenerative operation. Further, basically the generated electric power of the first rotary electric machine 30 is used to drive the second rotary electric machine 40 by powered operation and the power of the second rotary electric machine 40 is transmitted to the wheel drive shaft 2 in addition to the one power of the internal combustion engine 10 to drive the vehicle 100.

In the case of a hybrid vehicle able to switch the driving mode between the EV mode and the HV mode in this way, to keep down the amount of fuel consumption, it is desirable to set the EV mode on a priority basis as the driving mode while there is leeway in the charged amount of the battery.

On the other hand, the internal combustion engine 10 tends to become poor in heat efficiency the lower the engine load. For this reason, for example, at the time of a driving section with a large number of traffic lights, a driving section with a large amount of traffic and easy congestion, or other driving section in which a vehicle frequently repeatedly starts and stops or continues being driven at a low speed, it is desirable to set the driving mode to the EV mode to drive the vehicle 100.

Further, it is desirable to set the driving mode to the HV mode to drive the vehicle 100 at the time of a driving section enabling continuous steady driving with a certain constant level or more of vehicle speed maintained as is or other driving section enabling driving in a region of engine load with a good heat efficiency.

Therefore, in the case of a hybrid vehicle able to switch the driving mode between the EV mode and HV mode, preparing in advance a driving plan specifying at which driving sections on a projected route on one trip to a destination (between when start switch 214 of vehicle is turned on and when it is turned off) to drive by the EV mode and switching the driving modes according to that driving plan can be said to be an effective means for keeping down the amount of fuel required for driving.

However, such a conventional driving plan was a driving plan optimizing driving for one trip and did not consider at all the fuel excessively consumed for warming up the exhaust purification catalyst of the internal combustion engine 10. That is, when first starting up the internal combustion engine 10 at each trip, fuel is excessively consumed for promoting the warm-up of the catalyst for securing the exhaust performance, but in the past, the driving plan was prepared without considering this amount of fuel consumption for warming up the catalyst.

Here, for example, consider the case when traveling back and forth between the home and workplace, the case when making the rounds of a plurality of destinations (via-points) and returning to the home or other initial starting point, or otherwise driving over an entire driving route comprised of a plurality of trips (in the former case, two trips of an outbound and return trip, while in the latter case, for example, three trips if there are two destinations).

For example, if considering the case of traveling back and forth between the home and workplace, a conventional driving plan optimizes the outboard and return trips, so sometimes HV sections (driving sections where driving mode is set to the HV mode) are set on both of the outboard and return driving routes. If doing this, fuel for warming up the catalyst is excessively consumed at least one time each on both of the outboard and return trips.

As opposed to this, if possible to prepare a driving plan able to optimize the driving of an entire driving route comprised of a plurality of trips and drive entirely in the EV mode over one of the outbound and return driving routes, a single operation for warming up the catalyst is enough, so it is possible to keep down the consumption of fuel for warming up catalyst. As a result, if viewing the total amount of fuel consumption in the case of traveling back and forth between the home and workplace, compared with the case of optimizing the driving of each outbound and return trip like in a conventional driving plan, sometimes it is possible to keep down the consumption of fuel for warming up the catalyst and keep down the total amount of fuel consumption.

Therefore, in the present embodiment, it is made possible to prepare a driving plan able to reduce the number of times of warming up the catalyst. Below, preparation of a driving plan according to the present embodiment will be explained referring to FIG. 2A to FIG. 4C.

Figure 2A:
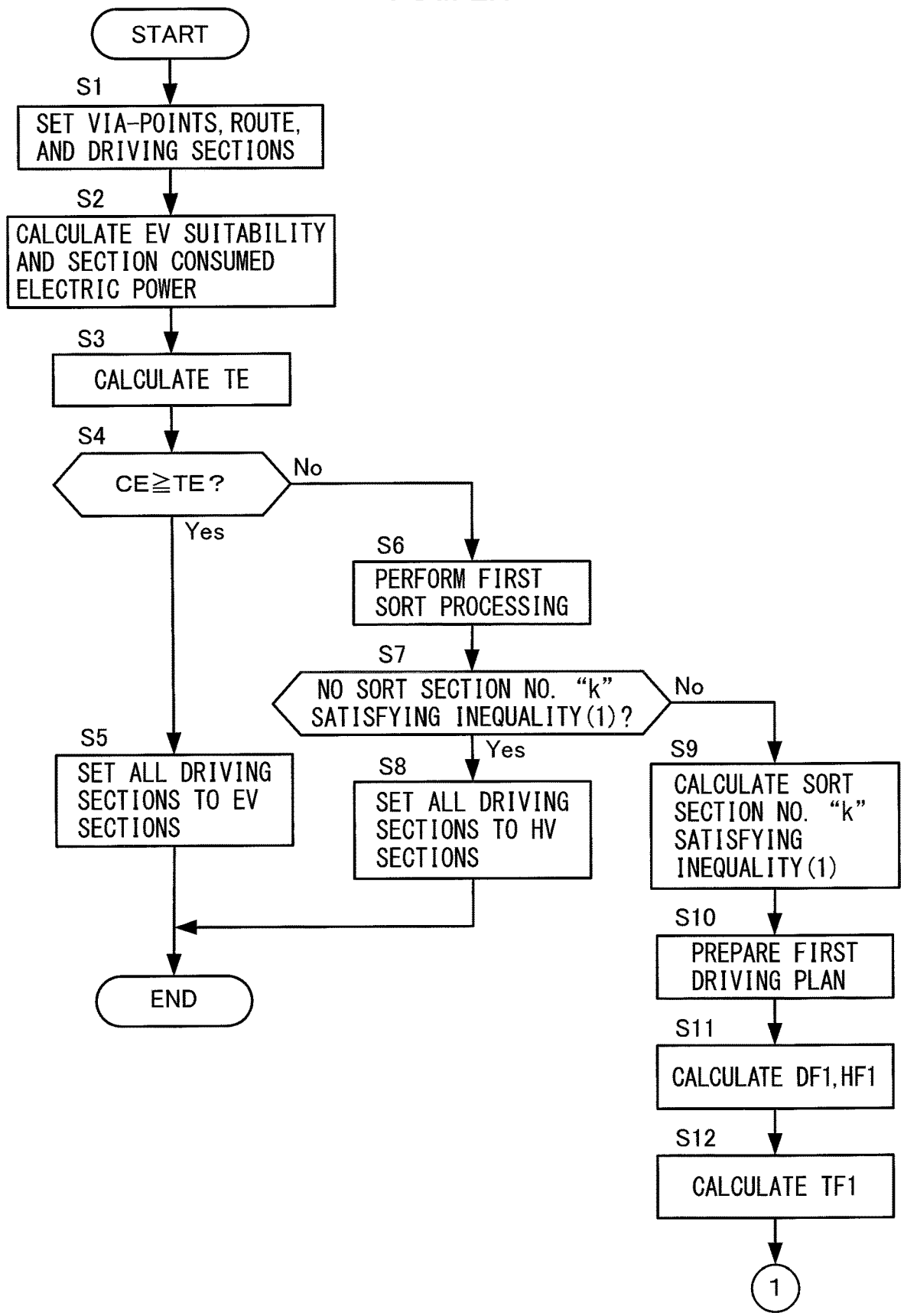
FIG. 2A is a flow chart for explaining preparation of a driving plan according to the first embodiment of the present disclosure.
Figure 2B:
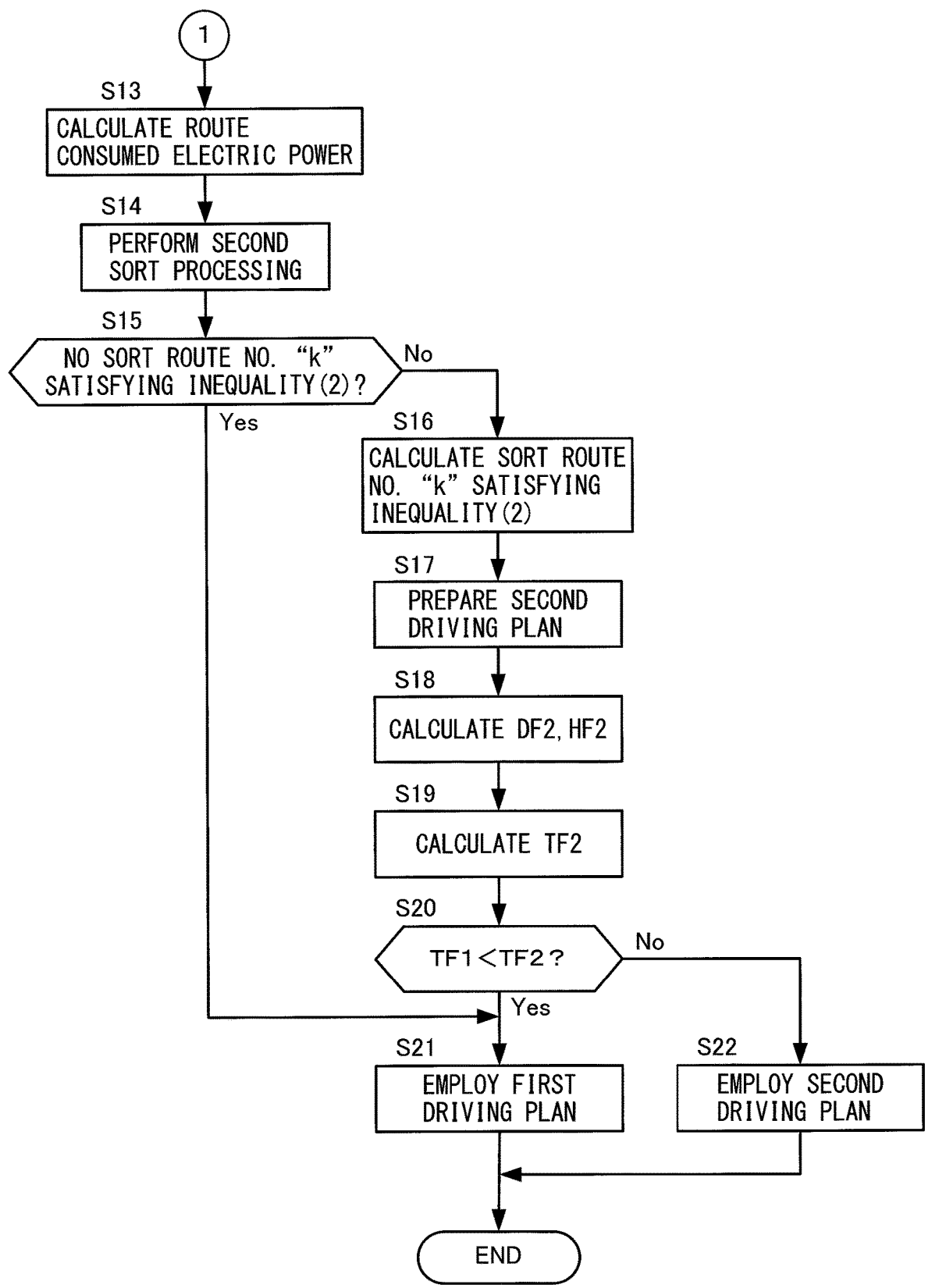
FIG. 2B is a flow chart for explaining preparation of a driving plan according to the first embodiment of the present disclosure.

FIG. 2A and FIG. 2B are flow charts for explaining preparation of a driving plan according to the present embodiment. Further, FIG. 3A to FIG. 3C explain the preparation of a first driving plan (section driving plan) optimizing the driving of one trip, while FIG. 4A to FIG. 4C are views explaining the preparation of a second driving plan (route driving plan) optimizing a plurality of trips.

Figure 3A:
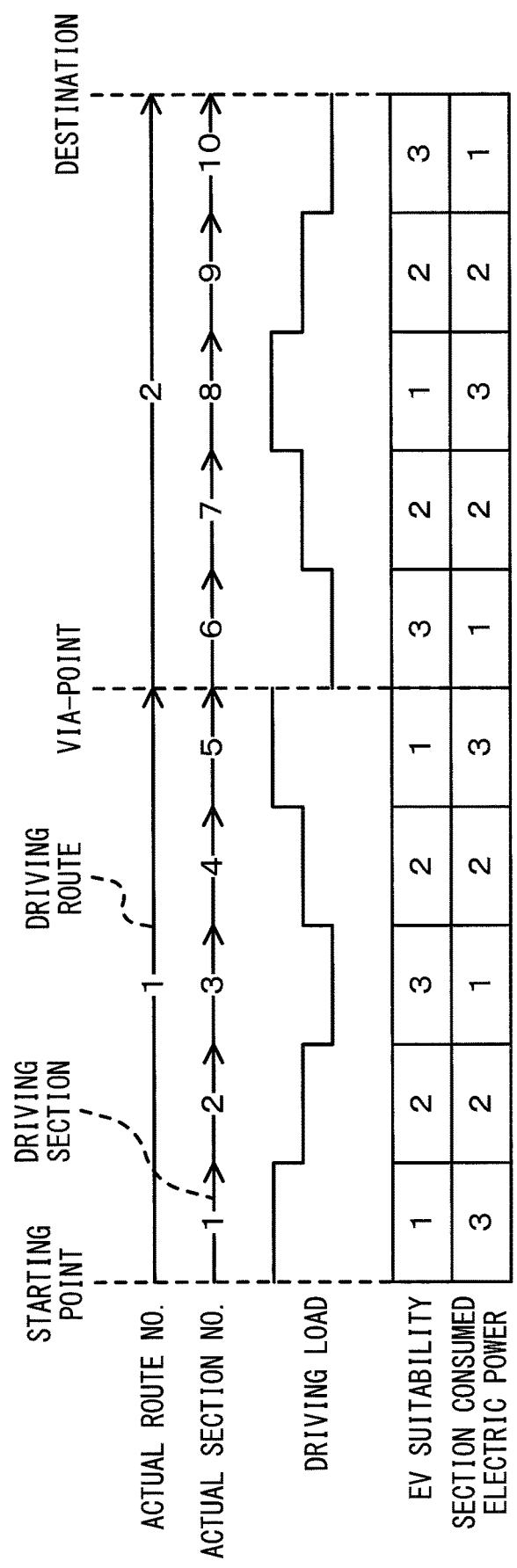
FIG. 3A is a figure for explaining preparation of a first driving plan optimizing driving of one trip.
Figure 4A:
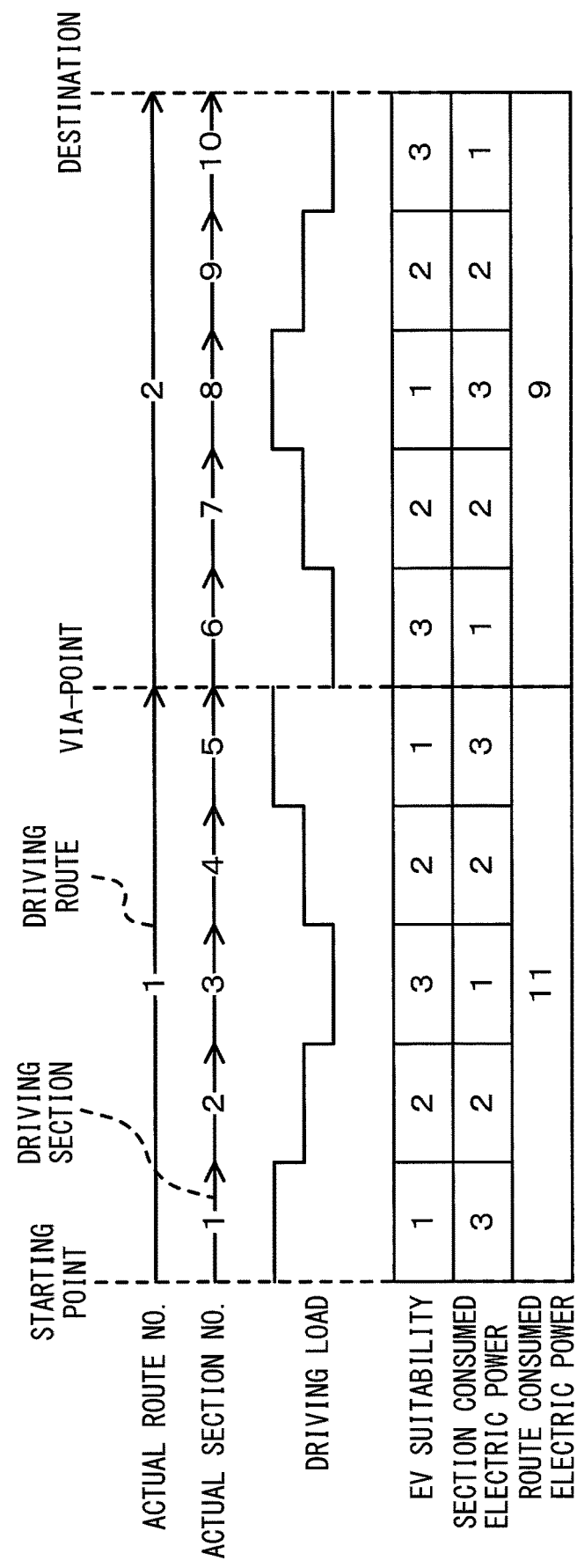
FIG. 4A is a view explaining the preparation of a second driving plan according to the first embodiment of the present disclosure optimizing a plurality of trips.
Figure 4C:
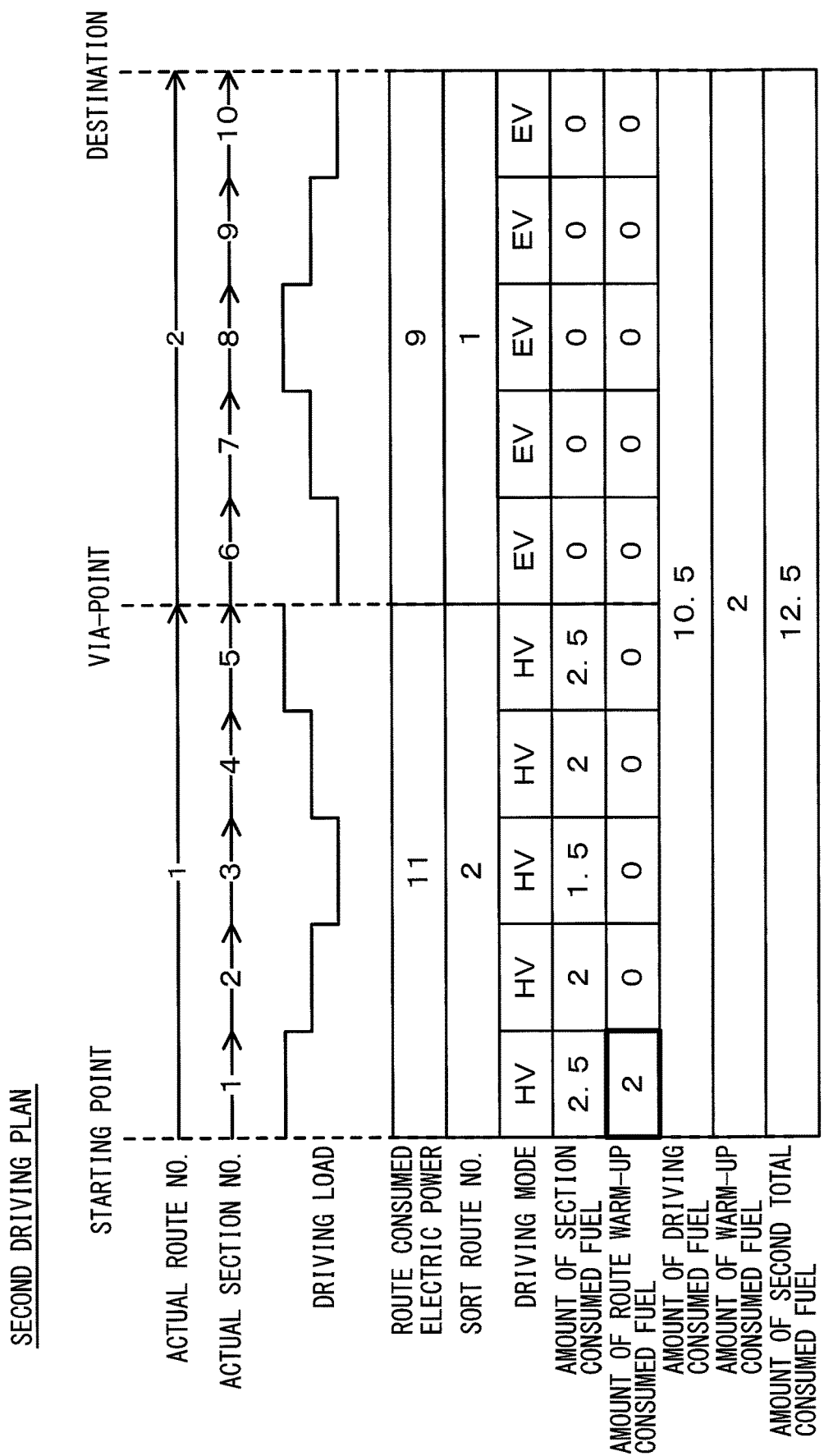
FIG. 4C is a view explaining the preparation of the second driving plan according to the first embodiment of the present disclosure optimizing a plurality of trips.

At step S1, the electronic control unit 200, as shown in FIG. 3A, sets one or more via-points on a projected route from a starting point to a destination to roughly divide the projected route to a plurality of driving routes and divide the driving routes more finely to pluralities of driving sections. Further, it sets actual section nos. "i" (i=1, . . . , n; in the example shown in FIG. 3A, n=10) for the driving sections in the order from the starting point and sets actual route nos. "i" (i=1, . . . , n; in example shown in FIG. 3A, n=2) for the driving routes.

Here, the starting point and destination are, for example, made the home garage or other main storage location of the vehicle 100. Note that, if the vehicle 100 preparing the driving plan is a plug-in hybrid vehicle like in the present embodiment, it is possible to make the starting point or destination a plug-in chargeable location.

Further, a via-point is made the end point of one trip. For example, it is made the destination set at the starting point (future destination). In addition to this as well, for example, in the case of a vehicle making the rounds of a predetermined plurality of destinations, the destinations may be made the via-points, while in the case of a vehicle being used for commuting to work or commuting to school, the workplace or the school place can be made the via-point. By setting via-points on a projected route in this way, it becomes possible to prepare a driving plan corresponding to a plurality of trips.

At step S2, the electronic control unit 200 calculates the driving loads of the driving sections based on the road information (for example, gradients and road types, speed limits, average curvature, etc.) of the driving sections. Further, the electronic control unit 200, as shown in FIG. 3A, calculates the EV suitabilities of the driving sections and the amounts of estimated consumed electric power of the driving sections when the driving sections are driven over by the EV mode (below, referred to as "section consumed electric power") based on the driving loads of the driving sections. The EV suitability is an indicator expressing to what extent each driving section is suitable for EV driving and is made a higher value the lower the driving load of each driving section (that is, the more suitable for EV driving).

In FIG. 3A, to facilitate understanding of the disclosure, the EV suitability is described simplified by classifying the EV suitability based on the driving load of each driving section into "1" (low EV suitability) to "3" (high EV suitability). Further, the section consumed electric power as well is described simplified by classifying the section consumed electric power in accordance with its magnitude into "1" (small section consumed electric power) to "3" (large section consumed electric power).

At step S3, the electronic control unit 200 calculates the amount of estimated power consumption TE when driving over a projected route by the EV mode (below, referred to as the "total consumed electric power") based on the section consumed electric power of the driving sections.

At step S4, the electronic control unit 200 calculates the amount of electric power CE of the battery 50 able to be used for EV driving based on the battery charging amount (below, referred to as the "usable electric power") and judges if the usable electric power CE is the total consumed electric power TE or more. The electronic control unit 200 proceeds to the processing of step S5 when the usable electric power CE is the total consumed electric power TE or more. On the other hand, the electronic control unit 200 proceeds to the processing of step S6 when the usable electric power CE is less than the total consumed electric power TE.

At step S5, the electronic control unit 200 sets all of the driving sections to EV sections to enable driving over a projected route by the EV mode if the usable electric power CE is the total consumed electric power TE or more.

Figure 3B:
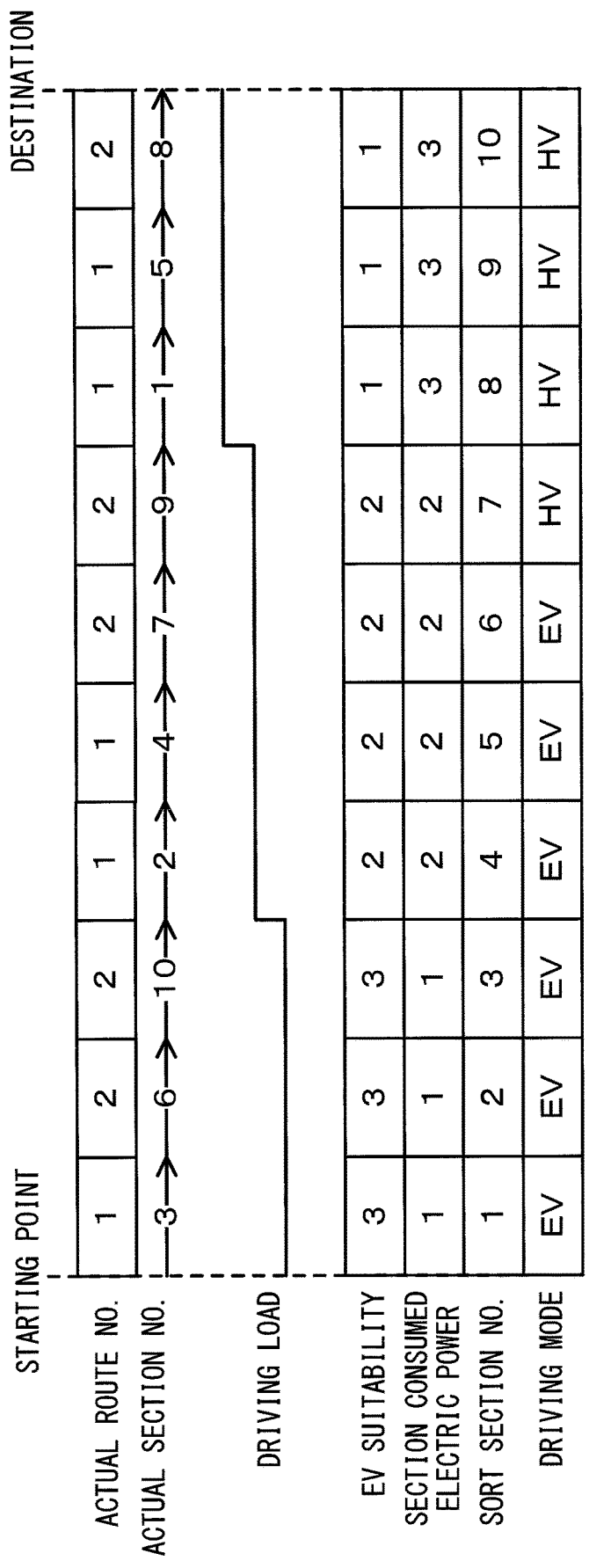
FIG. 3B is a figure for explaining preparation of the first driving plan optimizing driving of one trip.

At step S6, the electronic control unit 200, as shown in FIG. 3B, performs first sort processing to rearrange the driving sections and sets sort section nos. "i" (i=1, ..., n; in the example shown in FIG. 3B, n=10) for the driving sections in the rearranged order. Specifically, the electronic control unit 200, as shown in FIG. 3B, ignores the driving route and rearranges the driving sections in the order of the highest EV suitability down. It rearranges driving sections with the same EV suitability in the order of the smallest section consumed electric power up. If the section consumed electric power is also the same, it rearranges the driving sections in the order of the smallest actual section no. up.

At step S7, the electronic control unit 200 judges the presence of any sort section no. "k" satisfying the following inequality (1). Note that DE shows the added value obtained by adding the section consumed electric power in the order of the driving section with the highest EV suitability down and smallest section consumed electric power up. In the inequality (1), $DE_k$ is the total value (added value) of the section consumed electric power of the driving sections from the sort section no. 1 to the sort section no. "k", while $DE_{k+1}$ is the total value (added value) of the section consumed electric power of the driving sections from the sort section no. 1 to the sort section no. k+1:

$$DE_k \leq CE < DE_{k+1} \tag{1}$$

Specifically, the electronic control unit 200 judges that there is no sort section no. "k" satisfying the inequality (1) if the section consumed electric power $DE_1$ of the driving section when the sort section no. "k" is 1 is larger than the usable electric power CE. In this case, the electronic control unit 200 judges that there is no driving section in which driving is possible in the EV mode and proceeds to the processing of step S8. On the other hand, the electronic control unit 200 judges that there is a sort section no. "k" satisfying the inequality (1) if the section consumed electric power $DE_1$ of the driving section with a sort section no. "k" of 1 is the usable electric power CE or less and proceeds to the processing of step S9.

At step S9, the electronic control unit 200 calculates the sort section no. "k" satisfying the inequality (1).

At step S10, the electronic control unit 200, as shown in FIG. 3B, sets the driving sections from the sort section no. 1 to the sort section no. "k" (in the example shown in FIG. 3B, k=6) to EV sections (driving sections in which driving mode is set to EV mode) and sets the driving sections from the sort section no. k+1 to the sort section no. "n" to HV sections. Further, the electronic control unit 200, as shown in FIG. 3C, again rearranges the driving sections in the order of the actual section nos. to thereby prepare a first driving plan (section driving plan).

At step S11, the electronic control unit 200, as shown in FIG. 3C, calculates the estimated values of the amounts of fuel consumed for driving at the HV sections (below, referred to as the "amounts of section consumed fuel") and calculates the amount of driving consumed fuel DF1 at the first driving plan comprised of the total value of these based on the road information of the driving sections set as HV sections in the first driving plan.

Further, the electronic control unit 200 calculates the estimated values of the amounts of fuel consumed for warming up the catalyst on driving routes in which HV sections are set in the first driving plan (below, referred to as the "amounts of route warm-up consumed fuel") and calculates the amount of warm-up consumed fuel HF1 in the first driving plan comprised of the total value of these. In the present embodiment, as shown in FIG. 3C, it is considered that fuel is consumed for warming up the catalyst in driving sections in which the mode is first switched to the HV mode in the driving routes, that is, in driving sections where the mode is first switched to the HV mode in the trips.

At step S12, the electronic control unit 200 calculates the estimated value of the amount of fuel TF1 consumed when switching the driving modes according to the first driving plan while driving on a projected route (below, referred to as "the amount of the first total fuel consumption"). Specifically, the electronic control unit 200, as shown in FIG. 3C, adds the amount of driving consumed fuel DF1 and the amount of warm-up consumed fuel HF1 in the first driving plan to calculate the amount of the first total fuel consumption TF1.

At step S13, the electronic control unit 200, as shown in FIG. 4A, calculates the amounts of estimated consumed electric power on driving routes when driving over driving routes by the EV mode (below, "route consumed electric power") based on the section consumed electric power of the driving sections. In FIG. 4A, the total value of the section consumed electric power of the simplified driving sections for each driving route is described as the "route consumed electric power".

At step 14, the electronic control unit 200, as shown in FIG. 4B, performs second sort processing to rearrange the driving routes and set the sort route no. "i" (i=1, ..., n) at the driving routes in the rearranged order. Specifically, the electronic control unit 200, as shown in FIG. 4B, rearranges the driving routes in the order of the smallest route consumed electric power up.

At step S15, the electronic control unit 200 judges if there is a sort route no. "k" satisfying the following inequality (2). Note that RE shows the added value obtained by adding the route consumed electric power in the order from the driving route with the smallest route consumed electric power up. In the inequality (2), $RE_k$ is the total value (added value) of the route consumed electric power of the driving routes from the sort route no. 1 to the sort route number "k", while $RE_{k+1}$ is the total value (added value) of the route consumed electric power of the driving routes from the sort route no. 1 to the sort route number k+1:

$$RE_k \leq CE < RE_{k+1} \tag{2}$$

Specifically, the electronic control unit 200 judges that there is no sort route number "k" satisfying the inequality (2) if the route consumed electric power $RE_1$ of the driving route when the sort route number "k" is 1 is larger than the usable electric power CE. In this case, the electronic control unit 200 judges that there is no driving route which can be driven over in the EV mode as is and proceeds to the processing of step S21. On the other hand, the electronic control unit 200 judges that there is a sort route number "k" satisfying the inequality (2) if the route consumed electric power $RE_1$ of the driving route when the sort route number "k" is 1 is the usable electric power CE or less and proceeds to the processing of step S16.

At step S16, the electronic control unit 200 calculates the sort route number "k" satisfying the inequality (2).

At step S17, the electronic control unit 200, as shown in FIG. 4B, sets the driving routes up to the sort route number "k" (in the example shown in FIG. 4B, k=1) to EV routes in which all of the driving sections on the driving route are made EV sections and sets the driving routes from the sort route number k+1 to the sort route no. "n" to HV routes in which all of the driving sections on the driving route are made HV sections. Further, the electronic control unit 200, as shown in FIG. 4C, again rearranges the driving routes in the order of the actual route nos. to thereby prepare the second driving plan (route driving plan).

At step S18, the electronic control unit 200, as shown in FIG. 4C, calculates the amounts of section consumed fuel of the HV sections based on the road information of the driving sections set as HV sections in the second driving plan and calculates the amount of driving consumed fuel DF2 in the second driving plan comprised of the total value of these.

Further, the electronic control unit 200 calculates the amounts of route warm-up consumed fuel of driving routes in which HV sections are set in the second driving plan and calculates the amount of warm-up consumed fuel HF2 in the second driving plan comprised of the total value of these. As shown in FIG. 4C, in the second driving plan according to the present embodiment, an amount of route warm-up consumed fuel is generated at only the driving route with an actual route no. of 1.

At step S19, the electronic control unit 200 calculates the estimated value of the amount of fuel TF2 consumed when switching the driving modes according to the second driving plan while driving on a projected route (below, referred to as "the amount of the second total fuel consumption"). Specifically, the electronic control unit 200, as shown in FIG. 4C, adds the amount of driving consumed fuel DF2 and the amount of warm-up consumed fuel HF2 in the second driving plan to calculate the amount of the second total fuel consumption TF2.

At step S20, the electronic control unit 200 compares the magnitudes of the amount of first total fuel consumption TF1 and amount of second total fuel consumption TF2, proceeds to the processing of step S21 when the amount of first total fuel consumption TF1 is smaller, and proceeds to the processing of step S22 when the amount of second total fuel consumption TF2 is smaller. Note that when the amount of first total fuel consumption TF1 and amount of second total fuel consumption TF2 are the same, it is possible to proceed to the processing of either of step S21 and step S22, but in the present embodiment, the unit is made to proceed to the processing of step S22.

At step S21, the electronic control unit 200 employs the first driving plan and performs switching control of the driving mode in accordance with the first driving plan.

At step S22, the electronic control unit 200 employs the second driving plan and performs switching control of the driving mode in accordance with the second driving plan.

As shown in FIG. 3C and FIG. 4C, the amount of driving consumed fuel DF1 in the first driving plan optimizing the driving of one trip becomes smaller than the amount of driving consumed fuel DF2 in the second driving plan optimizing the driving of a plurality of trips. However, if considering the warm-up consumed fuel HF1 and HF2 in the driving plans, in the first driving plan, two operations of warming up the catalyst become necessary, so it is learned that the amount of first total fuel consumption TF1 becomes greater than the amount of second total fuel consumption TF2.

According to the present embodiment explained above, there is provided an electronic control unit 200 (control device) of a vehicle 100 (hybrid vehicle) provided with an internal combustion engine 10, rechargeable battery 50, and second rotary electric machine 40 (rotary electric machine) driven by electric power of the battery 50, comprising a driving plan preparing part preparing a driving plan setting one or more via-points on a projected route from a starting point to a destination to divide that projected route into a plurality of driving routes and further divide the driving routes into pluralities of driving sections and setting which driving mode of an EV mode of driving using electric power of the battery 50 as a main power supply or an HV mode of driving using the internal combustion engine 10 as a main power supply to drive with over each driving section and a driving mode switching part switching driving modes in accordance with the driving plan.

Further, the driving plan preparing part is configured to be able to prepare a driving plan setting the driving modes of all driving sections in at least one driving route to the EV mode.

Due to this, on a driving route (EV route) in which the driving modes of all driving sections in the driving route are set to the EV mode, there is no longer a need for warming up the catalyst, so it is possible to keep down the number of times of warming up the catalyst and keep down the amount of fuel consumed for warming up the catalyst.

Further, the driving plan preparing part according to the present embodiment is provided with a route consumed electric power calculating part calculating route consumed electric powers comprised of estimated values of electric power consumed when driving over driving routes by the EV mode and is configured to prepare a second driving plan (route driving plan) setting the driving modes of all of the driving sections in the driving routes to the EV mode in order from the driving route with the smallest route consumed electric power up and setting the driving modes of all of the driving sections in the driving routes to the HV mode from the driving routes at which the added value RE obtained by adding the route consumed electric power in the order from the driving route with the smallest route consumed electric power up exceeds the usable electric power CE of the battery 50 (driving routes with the sort route number k+1 on).

Due to this, it is possible to set driving routes as EV routes in order from the driving route with the highest possibility of being driven over by an EV mode down. That is, it is possible to increase the driving routes able to be set as EV routes as much as possible, so it is possible to prepare a driving plan with a possibility of being able to reduce the number of times of warming up the catalyst as much as possible to keep down the amount of fuel consumed for warming up the catalyst.

Further, the driving plan preparing part according to the present embodiment is provided with a suitability calculating part calculating EV suitabilities (suitabilities) when driving over driving sections by the EV mode and a section consumed electric power calculating part calculating section consumed electric power comprised of estimated values of electric power consumed when driving over the driving sections by the EV mode and is configured so as to prepare a first driving plan (section driving plan) setting the driving modes to the EV mode in order of the driving section with the highest suitability down and smallest section consumed electric power up and setting the driving modes to the HV mode from a driving section where an added value DE obtained by adding the section consumed electric power in order from the driving section with the highest suitability down and smallest section consumed electric power up exceeds the usable electric power CE of the battery (driving sections with sort section no. k+1 on).

Further, the driving mode switching part is configured to switch the driving mode in accordance with the second driving plan when the amount of the first total fuel consumption TF1 comprised of the total of the amounts of fuel consumed in driving routes in which there are driving sections set to the HV mode in the first driving plan is greater than the amount of the second total fuel consumption TF2 comprised of the total of the amounts of fuel consumed in the driving routes in which all driving sections are set to the HV mode in the second driving plan. The amount of the first total fuel consumption TF1 and the amount of the second total fuel consumption TF2 are respectively totals of the amounts of fuel consumed for driving and the amounts of fuel consumed for warming up the exhaust purification catalyst of the internal combustion engine 10.

Due to this, by keeping down the number of times of warming up the catalyst, it is possible to keep the fuel efficiency from ending up deteriorating.

Further, according to the present embodiment, a via-point is made the end point of one trip of the vehicle 100, so it is possible to prepare a driving plan optimizing a plurality of trips.

Second Embodiment

Next, a second embodiment of the present disclosure will be explained. The present embodiment differs from the first embodiment in the content of the second driving plan. Below, the points of difference will be focused on in the explanation.

Figure 5A:
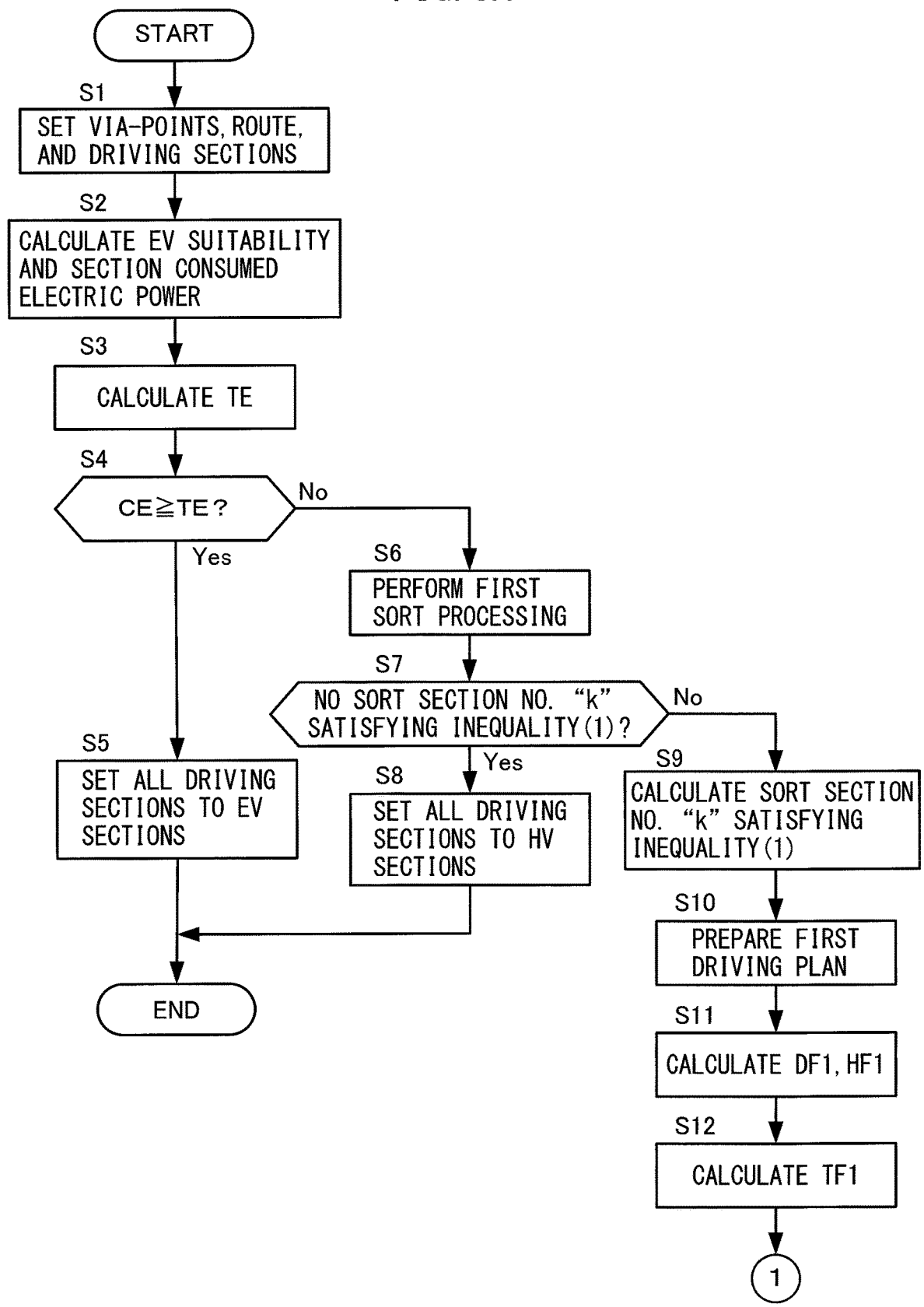
FIG. 5A is a flow chart for explaining the preparation of a driving plan according to a second embodiment of the present disclosure.
Figure 5B:
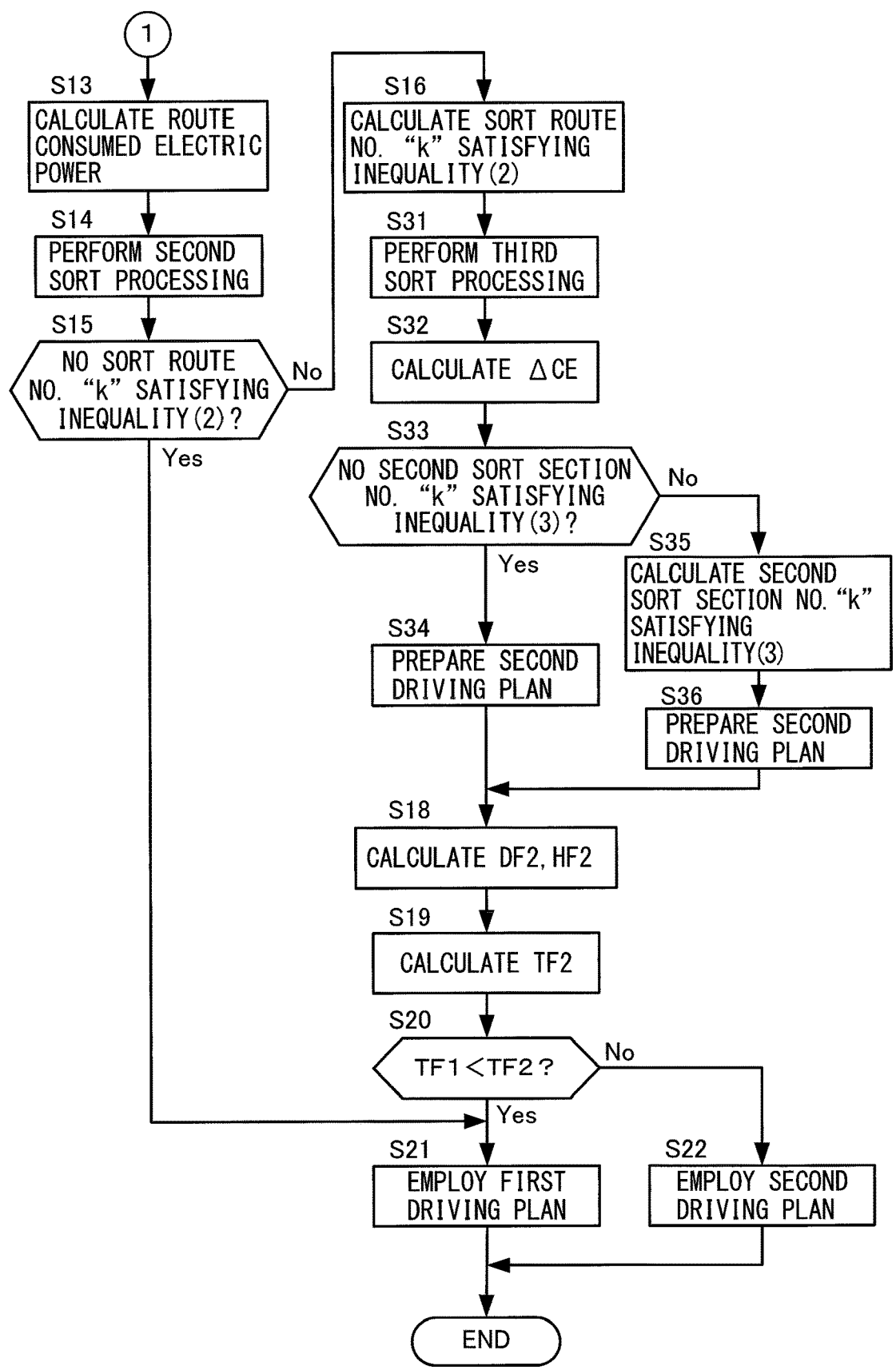
FIG. 5B is a flow chart for explaining the preparation of the driving plan according to the second embodiment of the present disclosure.

FIG. 5A and FIG. 5B are flow charts for explaining preparation of a driving plan according to the present embodiment. In FIG. 5A and FIG. 5B, the processing content from step S1 to step S16 and from step S18 to step S22 is basically content similar to the first embodiment, so the explanation will be omitted here. Further, FIG. 6A to FIG. 6E are views explaining the preparation of a second driving plan (route priority driving plan) according to the present embodiment optimizing a plurality of trips.

Figure 6A:
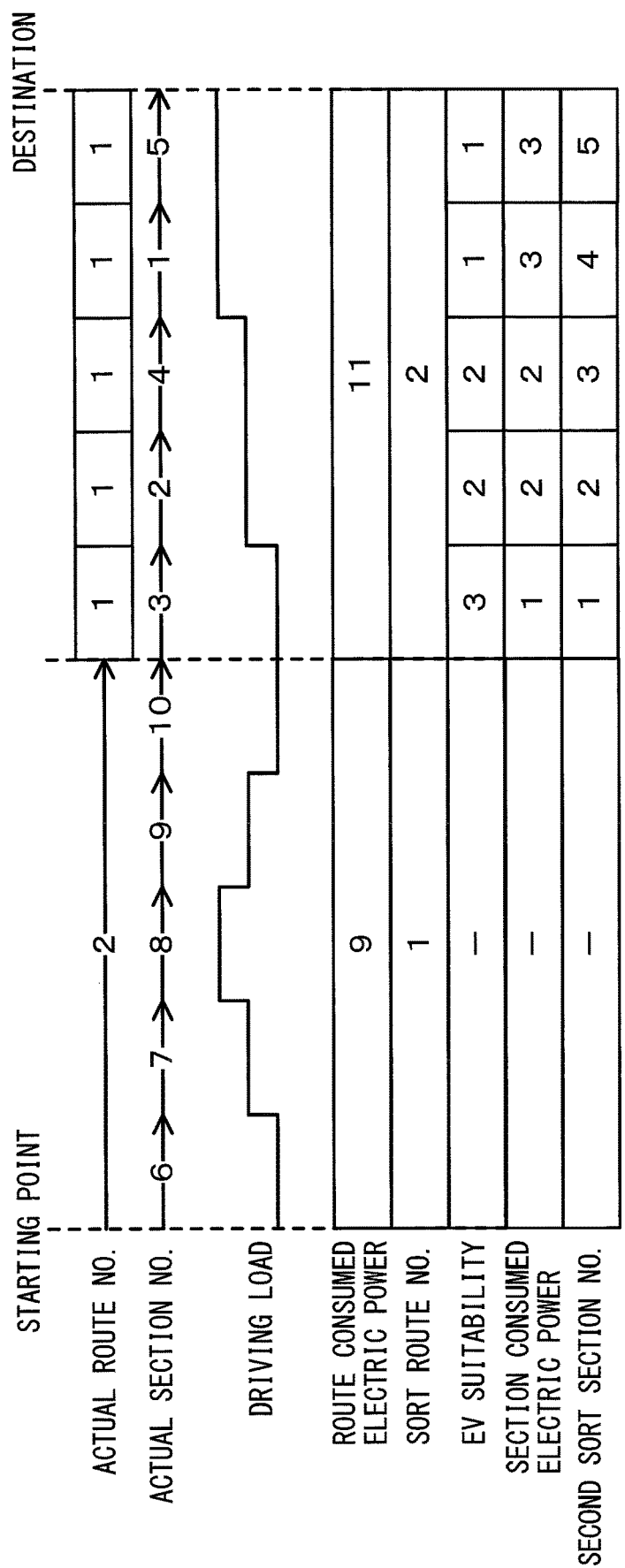
FIG. 6A is a view explaining the preparation of the second driving plan according to the second embodiment of the present disclosure optimizing a plurality of trips.

At step S31, the electronic control unit 200, as shown in FIG. 6A, performs third sort processing on the driving sections on the driving routes from the sort route number k+1 to the sort route no. "n" (in the example shown in FIG. 6A, k=1, n=2) to rearrange the driving sections and sets second sort section nos. "i" (i=1, . . . , n; in the example shown in FIG. 6A, n=5) for the driving sections in the rearranged order. Specifically, the electronic control unit 200, as shown in FIG. 6A, rearranges the driving sections on the driving routes from the sort route number k+1 to the sort route no. "n" in the order of the highest EV suitability down, rearranges driving sections with the same EV suitability in the order of the smallest section consumed electric power up, and if the section consumed electric power is also the same, further rearranges the sections in the order of the smallest actual section no. up.

At step S32, the electronic control unit 200 calculates the excess electric power ΔCE of the battery 50 comprised of the usable electric power CE of the battery 50 minus the total value $RE_k$ of the route consumed electric power of the driving routes up to the sort route number "k".

At step S33, the electronic control unit 200 judges if there is a second sort section no. "k" satisfying the following inequality (3). Note that EE shows the added value obtained by adding the second consumed electric power in the order from the driving section with a high EV suitability down and smallest section consumed electric power up in the driving routes from the sort route number k+1 to the sort route no. "n". In the inequality (3), $EE_k$ is the total value (added value) of the section consumed electric power of the driving sections from the second sort section no. 1 to the second sort section no. "k", while $EE_{k+1}$ is the total value of the section consumed electric power of the driving sections from the second sort section no. 1 to the sort section no. k+1:

$$EE_k \leq \Delta CE < EE_{k+1} \quad (3)$$

Specifically, the electronic control unit 200 judges that there is no second sort section no. "k" satisfying the inequality (3) if the section consumed electric power $EE_1$ of the driving section when the second sort section no. "k" is 1 is larger than the excess electric power ΔCE. In this case, the electronic control unit 200 judges that there is no driving section able to be driven on by the EV mode in the driving sections on the driving routes from the sort route number k+1 to the sort route no. "n" and proceeds to the processing of step S34. On the other hand, the electronic control unit 200 judges that there is a second sort section no. "k" satisfying the inequality (3) if the section consumed electric power $EE_1$ of the driving section when the second sort section no. "k" is 1 is the excess electric power ΔCE or less and proceeds to the processing of step S35.

Figure 6B:
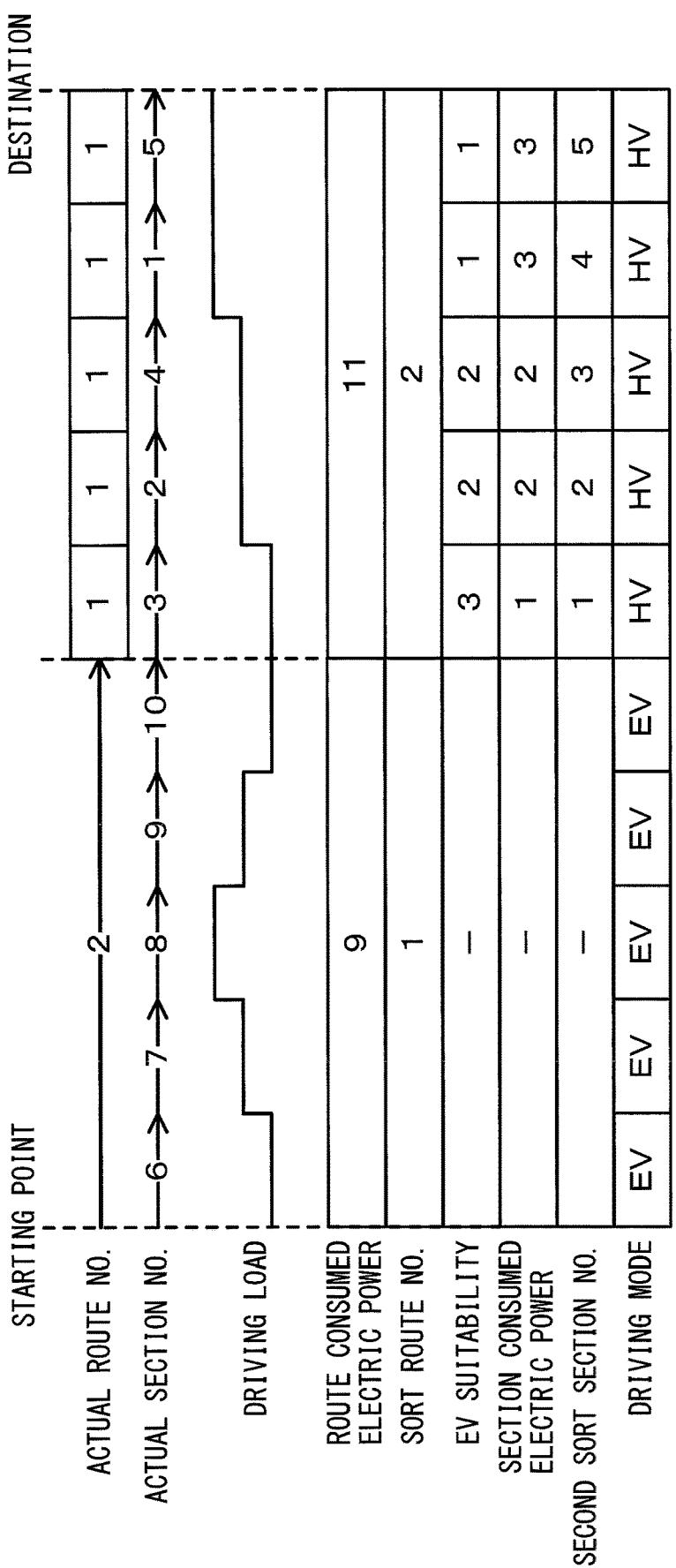
FIG. 6B is a view explaining the preparation of the second driving plan according to the second embodiment of the present disclosure optimizing a plurality of trips.

At step S34, the electronic control unit 200, in the same way as the first embodiment, as shown in FIG. 6B, sets the driving routes up to the sort route number "k" (in the example shown in FIG. 6B, k=1) to EV routes in which all of the driving sections on the driving route are made EV sections and sets the driving routes from the sort section no. k+1 to the sort section no. "n" to HV routes in which all of the driving sections on the driving route are made HV sections. Further, the electronic control unit 200, as shown in FIG. 6C, rearranges the driving routes in the order of the actual route nos. and sets the result as the second driving plan (route priority driving plan).

At step S35, the electronic control unit 200 calculates the second sort section no. "k" satisfying the inequality (3).

Figure 6D:
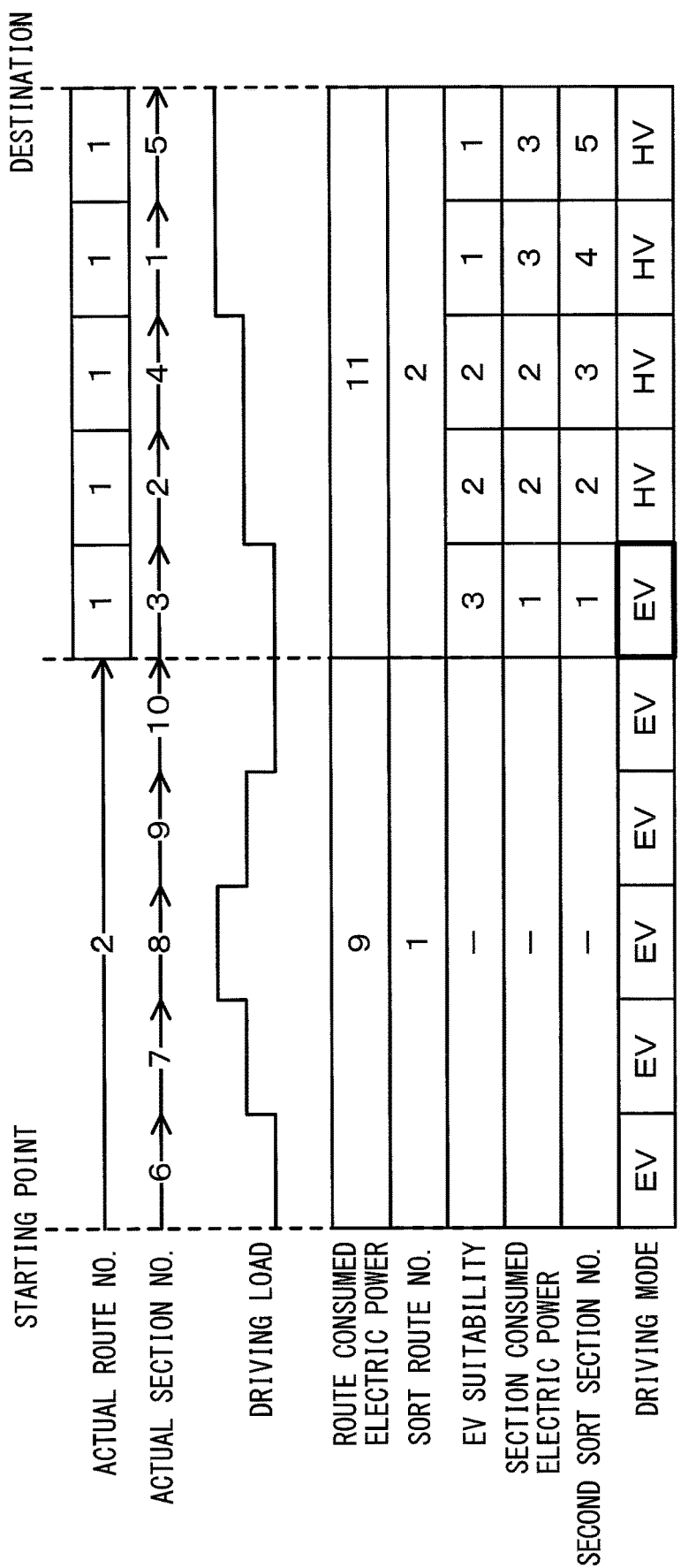
FIG. 6D is a view explaining the preparation of the second driving plan according to the second embodiment of the present disclosure optimizing a plurality of trips.
Figure 6E:
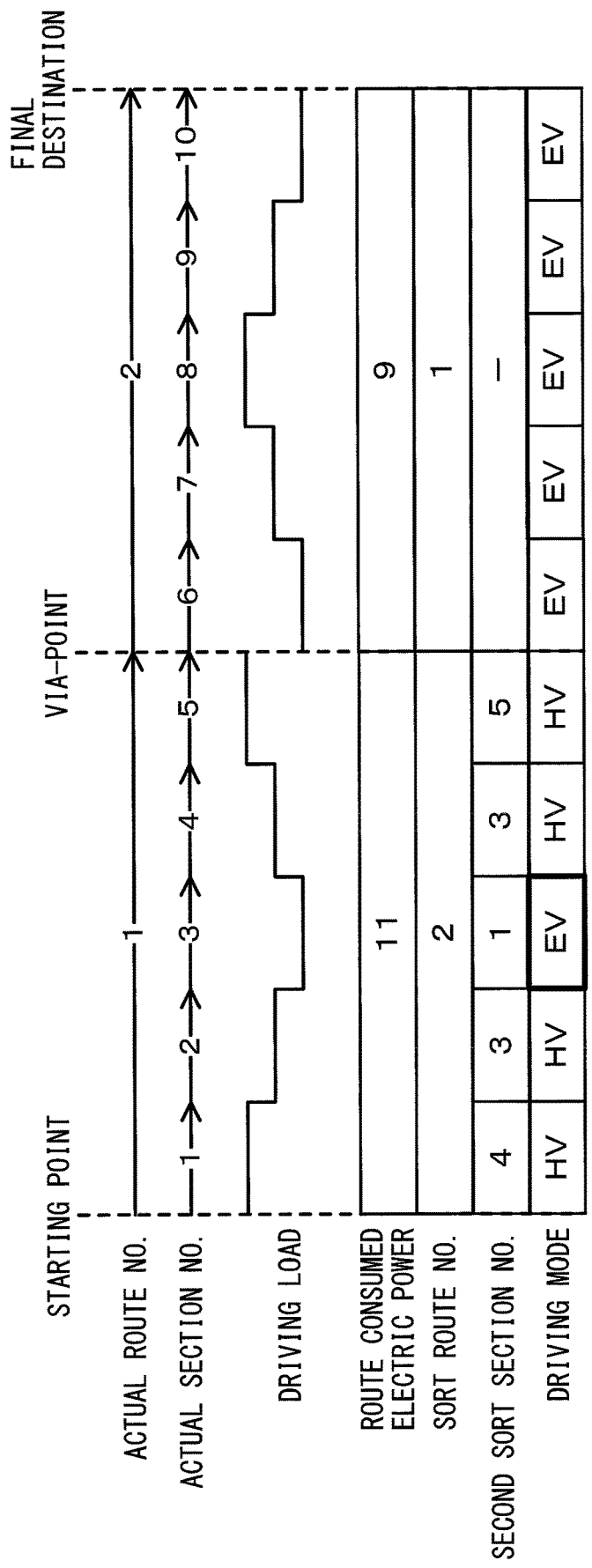
FIG. 6E is a view explaining the preparation of the second driving plan according to the second embodiment of the present disclosure optimizing a plurality of trips.

At step S36, the electronic control unit 200, as shown in FIG. 6D, sets the driving routes up to the sort route number "k" (in the example shown in FIG. 6D, k=1) to EV routes in which all of the driving sections on the driving route are made EV sections. Further, the electronic control unit 200, unlike the first embodiment, for the driving sections on the driving routes from the sort route number k+1 to the sort route no. "n", sets the driving sections up to the second sort section no. "k" (in the example shown in FIG. 6D, k=1) to EV sections and sets the driving sections from the second sort section no. k+1 to the second sort section no. "n" (in the example shown in FIG. 6D, n=5) to HV sections. Further, the electronic control unit 200, as shown in FIG. 6E, rearranges the driving sections in the order of the actual section nos. and sets the result as the second driving plan (route priority driving plan).

The driving plan preparing part according to the present embodiment explained above is provided with a suitability calculating part calculating EV suitabilities (suitabilities) when driving over driving sections by the EV mode, a section consumed electric power calculating part calculating a section consumed electric power comprised of an estimated value of electric power consumed when driving over the driving sections by the EV mode, and a route consumed electric power calculating part calculating a route consumed electric power comprised of an estimated value of electric power consumed when driving over the driving routes by the EV mode.

Further, the driving plan preparing part is configured to prepare a second driving plan (route priority driving plan) setting driving routes up to where a first added value RE obtained by adding the route consumed electric power in order from the driving route with the smallest route consumed electric power up exceeds the usable electric power CE of the battery 50 to EV routes in which the driving modes of all of the driving sections in the driving route are made the EV mode in order from the driving route with the smallest route consumed electric power up, setting, for driving routes in which the first added value RE exceeds the usable electric power CE of the battery 50, the driving sections up to where a second added value EE obtained by adding the section consumed electric power in order from the driving section with a high EV suitability down and small section consumed electric power up in the driving routes exceeds an excess electric power ΔCE of the battery 50 comprised of the usable electric power CE of the battery 50 minus the total value REk of the route consumed electric power of the EV route to EV modes, and setting driving modes to HV modes from the driving section in which the second added value EE exceeds the excess electric power ΔCE of the battery 50.

Due to this, according to the present embodiment, if there is a driving section which can be set as an EV section in consideration of the excess electric power ΔCE of the battery among the driving sections on a driving route set as an HV route in the first embodiment, it is possible to prepare a second driving plan setting a driving section with a high EV suitability among them as an EV section with priority. For this reason, it is possible to increase as much as possible the driving routes able to be set as EV routes while, it is possible to set a section which had been set as an HV section in the first embodiment as an EV section using excess electric power ΔCE of the battery, so it is possible to keep down the overall amount of consumed fuel when driving over a projected route.

Further, the driving plan preparing part according to the present embodiment is further configured to prepare a section driving plan setting the driving modes to EV modes in order from the driving section with the highest EV suitability (suitability) down and smallest section consumed electric power up and setting the driving modes to HV modes from the driving section in which a third added value DE obtained by adding the section consumed electric power in order from the driving section with the highest EV suitability down and smallest section consumed electric power up exceeds the usable electric power CE of the battery 50.

Further, the driving mode switching part is configured so as to switch the driving modes in accordance with the second driving plan (route priority driving plan) when the amount of the first total fuel consumption TF1 comprised of the total of the amounts of fuel consumed in driving routes in which there are driving sections set to HV modes in a section driving plan is greater than the amount of the second total fuel consumption TF2 comprised of the total of the amounts of fuel consumed in driving routes in which there are driving sections set to HV modes in a route priority driving plan.

Due to this, it is possible to switch the driving mode in accordance with a driving plan enabling the overall amount of consumed fuel when driving over a projected route to be kept down the most.

Third Embodiment

Next, a third embodiment of the present disclosure will be explained. The present embodiment differs from the second embodiment on the point that the temperature of the catalyst which was warmed up once is kept from ending up falling to the activation temperature or less in the EV sections. Below, the points of difference will be focused on in the explanation.

The driving plan preparing part of the second embodiment explained above was configured so as to prepare a second driving plan (route priority driving plan) setting driving sections from driving sections with high EV suitability as EV sections with priority in the case where there is a driving section able to be set as an EV section considering the excess electric power ΔCE of the battery among the driving sections of a driving route set as an HV route in the first embodiment.

For this reason, in the second embodiment, as shown in FIG. 6E, EV sections are set on part of a driving route set as an HV route in the first embodiment (in FIG. 6E, a driving route with an actual route no. of 1). That is, a driving route in which HV sections and EV sections are mixed is generated. If in this way a driving route in which HV sections and EV sections are mixed is generated, the following such problem is liable to arise. Below, referring to FIG. 7, this problem will be explained.

Figure 7:
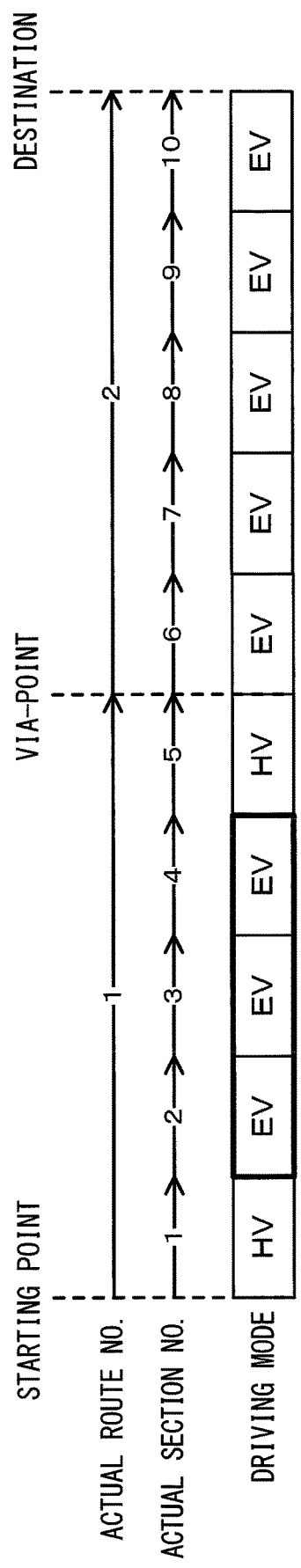
FIG. 7 is a view showing one example of the second driving plan (route priority driving plan).

FIG. 7 is a view showing one example of a second driving plan (route priority driving plan). In the example shown in FIG. 7, the driving route with the actual route no. of 1 is a driving route with HV sections and EV sections mixed together, while the driving route with the actual route no. of 2 is an EV route.

If a driving route with HV sections and EV sections mixed together is generated, for example, as shown in FIG. 7, sometimes a succession of driving sections set as EV sections (in FIG. 7, driving sections with actual section nos. of 2 to 4) continue after a driving section set as an HV section (in FIG. 7, driving section with actual section no. of 1), then a driving section set as an HV section (in FIG. 7, a driving section with an actual section no. of 5) arises again.

If a succession of driving sections set as EV sections continues in this way, the time or distance of driving in the EV mode becomes longer, so the temperature of the catalyst finished being warmed up in an HV section before an EV section is liable to end up falling to the activation temperature at which the exhaust purification function of the catalyst is activated in an EV section or a less temperature. This being so, in an HV section after an EV section, the catalyst has to be warmed up again, so the exhaust performance deteriorates until the catalyst finishes warming up and the amount of fuel consumption when driving while switching the driving modes in accordance with the second driving plan ends up increasing more than envisioned.

Note that, if an HV section is not set after an EV section, the internal combustion engine 10 is never started up after the EV section, so even if the catalyst temperature falls to the activation temperature or less in the EV section, such a problem does not arise.

Therefore, in the present embodiment, in a driving route comprised of HV sections and EV sections mixed together, to prevent the temperature of a catalyst warmed up once from falling to the activation temperature or less in an EV section, when the catalyst temperature in an EV section falls to a predetermined temperature rise reference temperature higher than the activation temperature, the internal combustion engine 10 is temporarily made to operate to make the catalyst temperature rise only if an HV section is set after the EV section.

Figure 8B:
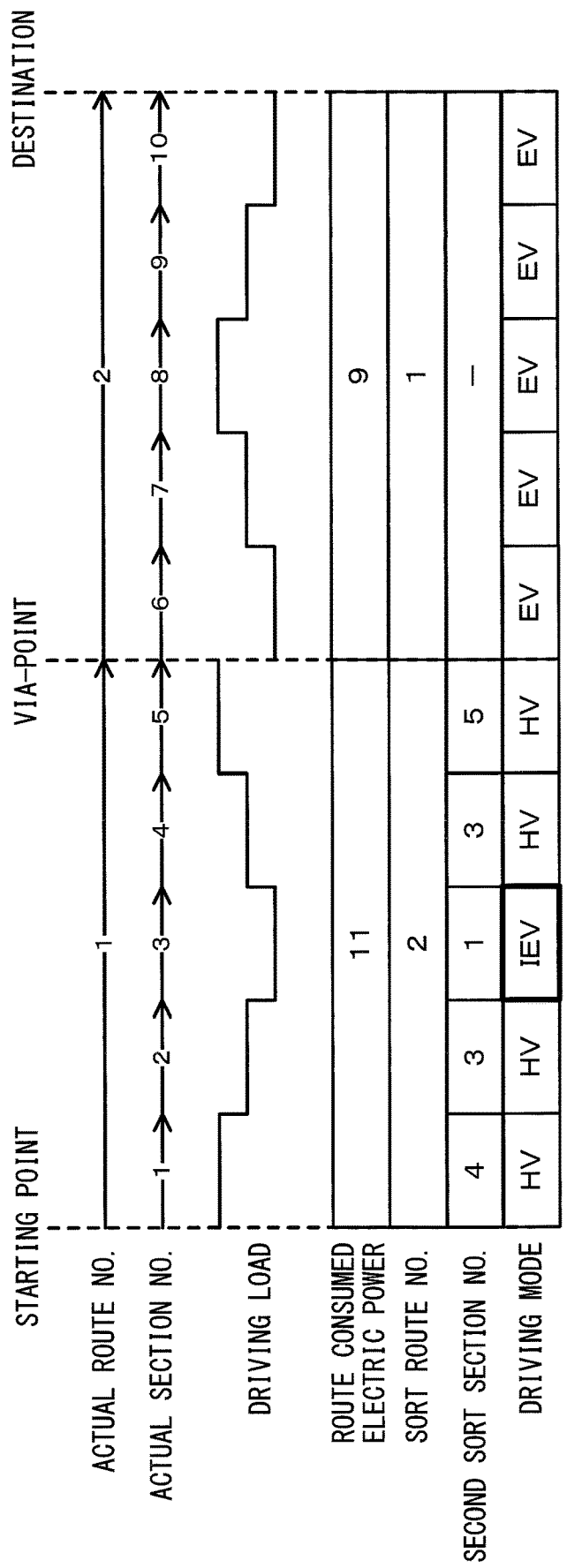
FIG. 8B is a view explaining the preparation of the second driving plan according to the third embodiment of the present disclosure optimizing a plurality of trips.

Below, preparation of a driving plan according to the present embodiment will be explained referring to FIG. 8A and FIG. 8B, then the catalyst temperature rise control according to the present embodiment will be explained referring to FIG. 9.

The flow chart relating to the preparation of a driving plan according to the present embodiment is basically similar to the flow chart of FIG. 5A and FIG. 5B explained in the second embodiment, but the processing of step S36 partially differs.

Specifically, in the present embodiment, at step S36, the electronic control unit 200, as shown in FIG. 8A, in the same way as the second embodiment, sets the driving routes up to the sort route number "k" (in the example shown in FIG. 8A, k=1) as EV routes in which all driving sections on the driving route are made EV sections. Further, the electronic control unit 200, unlike the second embodiment, for the driving sections on the driving routes from the sort route number k+1 to the sort route no. "n", sets the driving sections up to the second sort section no.

"k" (in the example shown in FIG. 8A, k=1) to EV sections covered by temperature rise control of the catalyst temperature (below, referred to as the "IEV section") and sets the driving sections from the second sort section no. k+1 to the second sort section no. "n" (in the example shown in FIG. 8A, n=5) to HV sections. Further, the electronic control unit 200, as shown in FIG. 8B, again rearranges the driving sections in the order of the actual section nos. and sets the result as the second driving plan (route priority driving plan).

FIG. 9 is a flow chart explaining catalyst temperature rise control according to the present embodiment.

At step S41, the electronic control unit 200 judges if the catalyst was already warmed up one time in the current trip. In the present embodiment, the electronic control unit 200 judges that the catalyst was already warmed up one time in the current trip if already driving once in the HV mode in the current trip and then proceeds to the processing of step S42. On the other hand, the electronic control unit 200 judges that the catalyst was still not warmed up even once in the current trip if not already driving once in the HV mode in the current trip and then ends the current processing.

At step S42, the electronic control unit 200 judges if the current driving section is an IEV section. The electronic control unit 200 proceeds to the processing of step S43 if the current driving section is an IEV section. On the other hand, the electronic control unit 200 ends the current processing if the current driving section is not an IEV section.

At step S43, the electronic control unit 200 judges if there is an HV section in the remaining driving sections of the current trip. The electronic control unit 200 proceeds to the processing of step S44 if there is an HV section in the remaining driving sections of the current trip. On the other hand, the electronic control unit 200 ends the current processing if there is no HV section in the remaining driving sections of the current trip.

At step S44, the electronic control unit 200 reads the catalyst temperature detected by the catalyst temperature sensor 210. In the IEV section, the vehicle is driven in the EV mode. The internal combustion engine 10 is not operated, so it is possible to precisely detect the catalyst temperature by the catalyst temperature sensor 210 without being affected by the exhaust discharged from the internal combustion engine 10.

Note that if no catalyst temperature sensor 210 is provided, it is also possible to estimate the catalyst temperature based on for example the catalyst temperature when stopping the internal combustion engine 10, the elapsed time from when stopping the internal combustion engine 10, etc.

At step S45, the electronic control unit 200 judges if the catalyst temperature is a predetermined control lower limit temperature or more. The control lower limit temperature is a temperature corresponding to the catalyst temperature at the time of cold start of the internal combustion engine 10 and, for example, can be made the average outside air temperature. The control lower limit temperature is a temperature lower than the activation temperature.

Even if the vehicle had already been driven in the HV mode one time in the current trip, if the driving time is short etc., it is conceivable that the catalyst temperature will not rise much at all and the, catalyst temperature will not change much at all from the temperature at the time of cold start of the internal combustion engine 10. In such a case, it is necessary to warm up the catalyst in an HV section after an IEV section, so it is not necessary to make the internal combustion engine 10 temporarily operate in the IEV section to make the catalyst temperature rise. For this reason, the electronic control unit 200 proceeds to the processing of step S46 if the catalyst temperature is a predetermined control lower limit temperature or more and ends the current processing if the catalyst temperature is less than the control lower limit temperature.

At step S46, the electronic control unit 200 judges if the catalyst temperature is less than a predetermined temperature rise reference temperature. The electronic control unit 200 proceeds to the processing of step S47 if the catalyst temperature is less than the temperature rise reference temperature. On the other hand, the electronic control unit 200 ends the current processing if the catalyst temperature is the temperature rise reference temperature or more.

At step S47, the electronic control unit 200 makes the internal combustion engine 10 start and makes the internal combustion engine 10 operate by exactly a predetermined time to thereby make the catalyst temperature rise.

Note that if proceeding to the processing of step S47, it is possible to limit the startup of the internal combustion engine 10 to when the driving load is a predetermined load or more. This is because, for example, if making the internal combustion engine 10 operate while the vehicle has stopped or during low speed driving or otherwise at the time of engine low load, the internal combustion engine 10 is made to operate in the state of a low heat efficiency, so conversely the amount of fuel consumption is liable to increase.

The electronic control unit 200 according to the present embodiment explained above is configured to further comprise a catalyst temperature rise control part performing catalyst temperature rise control making the temperature of the exhaust purification catalyst rise when the temperature of the exhaust purification catalyst becomes less than a predetermined temperature rise reference temperature higher than the activation temperature where the exhaust purification function of the exhaust purification catalyst is activated in the case of switching the driving modes in accordance with the second driving plan (route priority driving plan) when driving on a driving section on a driving route other than an EV route and set to an EV section (that is, an IEV section) if already warming up the exhaust purification catalyst of the internal combustion engine 10 on that driving route and there is an HV section in the remaining driving sections on the driving route. Specifically, it is configured to perform control for making the internal combustion engine 10 operate for exactly a predetermined time as the catalyst temperature rise control.

Due to this, even if the time or distance of continuous driving in an EV mode after a succession of driving sections set as EV sections becomes longer, the temperature of the catalyst made to complete warm-up in an HV section before the EV sections can be kept from ending up falling to the activation temperature or less in the EV sections. For this reason, it is possible to keep down deterioration of the exhaust performance in the HV section after the EV sections.

Further, if the catalyst temperature falls to the activation temperature or less during the EV sections, it is necessary to warm up the catalyst again in a subsequent HV section and it is necessary to warm up the catalyst a plurality of times during one trip, but like in the present embodiment, it is possible to make the internal combustion engine 10 operate for exactly a predetermined time during the EV sections to maintain the catalyst temperature at a high temperature to thereby keep down the increase in the amount of fuel consumption due to the increase in the number of times of warning up the catalyst. For this reason, it is possible to keep to a minimum extent the increase in the amount of fuel consumption when switching driving modes according to the second driving plan.

Fourth Embodiment

Next, a fourth embodiment of the present disclosure will be explained. The present embodiment differs from the third embodiment on the content of the catalyst temperature rise control. Below, the points of difference will be focused on in the explanation.

Figure 10:
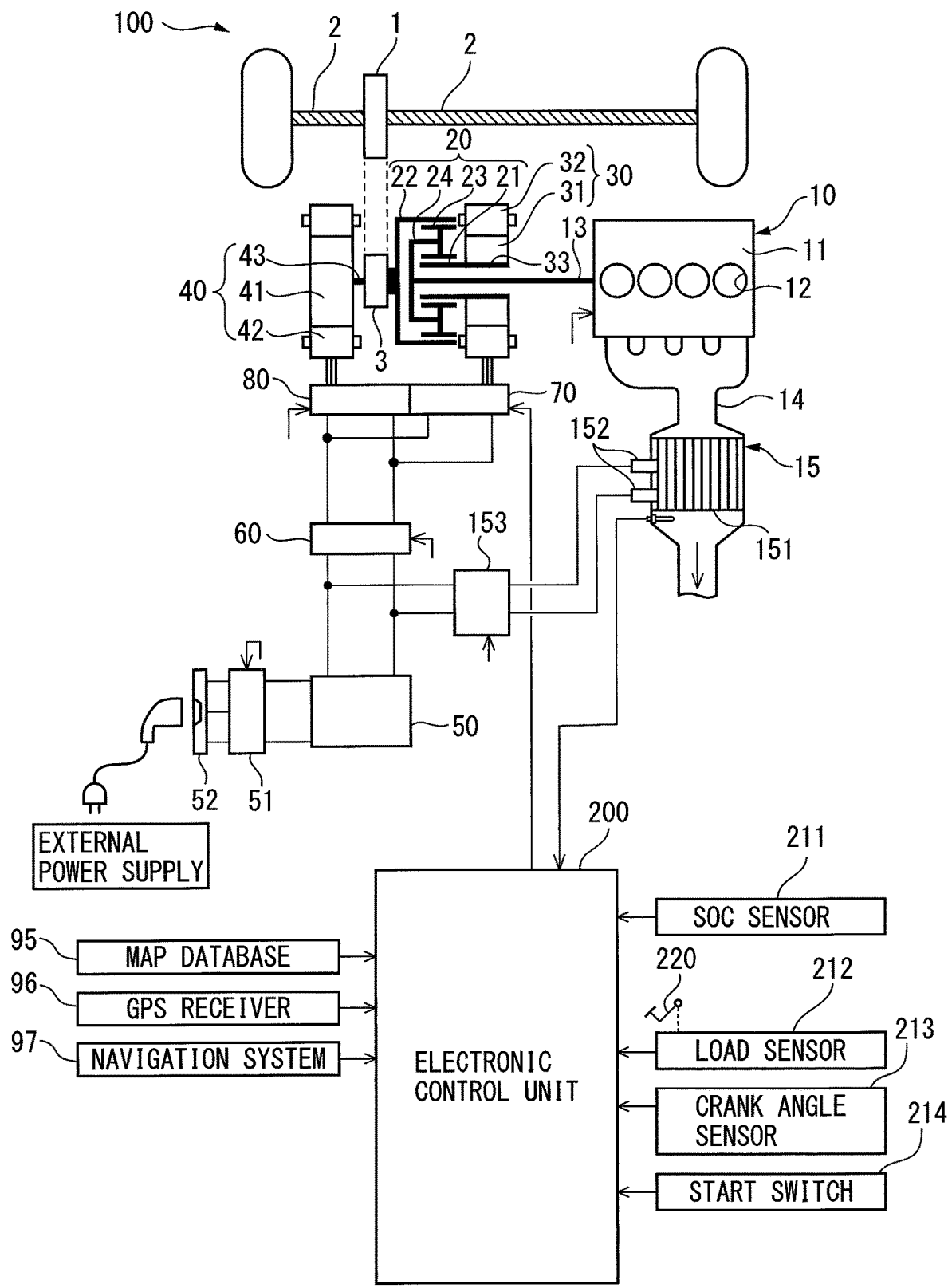
FIG. 10 is a schematic view of the configuration of a vehicle and an electronic control unit controlling the vehicle according to a fourth embodiment of the present disclosure.

FIG. 10 is a schematic view of the configuration of a vehicle 100 and an electronic control unit 200 controlling the vehicle 100 according to the fourth embodiment of the present disclosure.

As shown in FIG. 10, the catalyst device 15 of the internal combustion engine 10 according to the present embodiment is provided with a pair of electrodes 152 and a voltage adjustment circuit 153 so as to be able to supply electric power to the substrate 151 to heat the substrate 151.

The substrate 151 according to the present embodiment, for example, is formed by silicon carbide (SiC) or molybdenum disilicide ($MoSi_2$) or other material generating heat by carrying a current.

The pair of electrodes 152 are respectively electrically connected to the substrate 151 in the electrically insulated state and are connected through the voltage adjustment circuit 153 to the battery 50. By applying voltage through the pair of electrodes 152 to the substrate 151 to supply electric power to the substrate 151, current flows to the substrate 151 so that the substrate 151 generates heat and the catalyst supported on the substrate 151 is heated. The voltage applied by the pair of electrodes 152 to the substrate 151 can be adjusted by the electronic control unit 200 controlling the voltage adjustment circuit 153. For example, it is possible to apply the voltage of the battery 50 as it is and possible to apply the voltage of the battery 50 while lowering it to any voltage.

Figure 11:
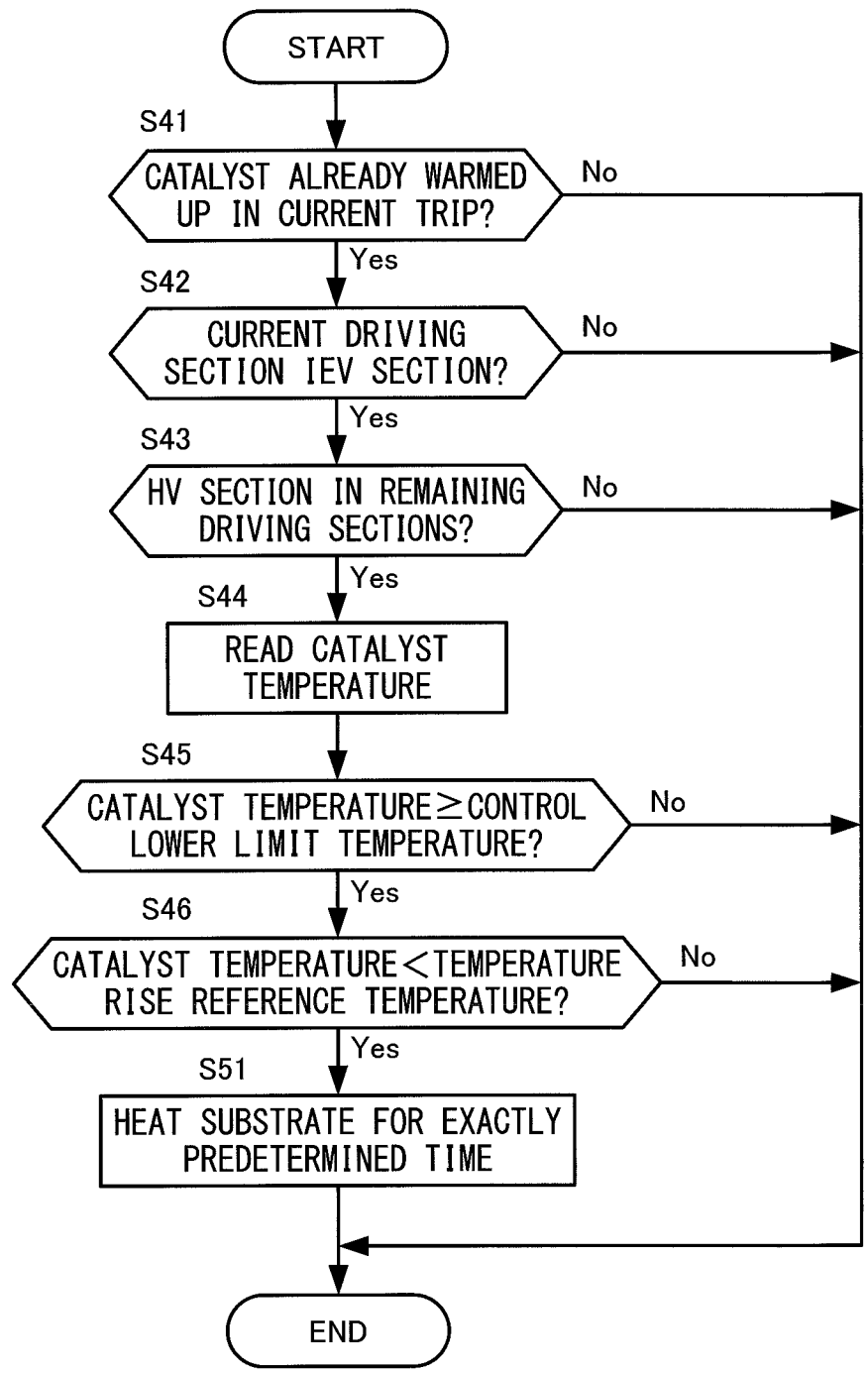
FIG. 11 is a flow chart explaining catalyst temperature rise control according to the fourth embodiment of the present disclosure.

FIG. 11 is a flow chart explaining temperature rise control of the catalyst temperature according to the present embodiment. In FIG. 11, the processing content of the processing from step S41 to step S46 is basically the same content as the third embodiment, so the explanation will be omitted here.

At step S51, the electronic control unit 200 applies voltage through the pair of electrodes 152 to the substrate 151 to supply electric power to the substrate 151 and heats the substrate 151 for exactly a predetermined time to thereby make the catalyst temperature rise.

Even if configuring the electronic control unit 200, like in the present embodiment explained above, to perform, as catalyst temperature rise control, control for supplying electric power to the substrate 151 to heat the substrate 151 for a predetermined time, advantageous effects similar to the third embodiment can be obtained.

Fifth Embodiment

Next, a fifth embodiment of the present disclosure will be explained. The present embodiment differs from the above embodiments on the point that part of the processing which was performed by the electronic control unit 200 is performed by the server 300. Below, the points of difference will be focused on in the explanation.

Figure 12:
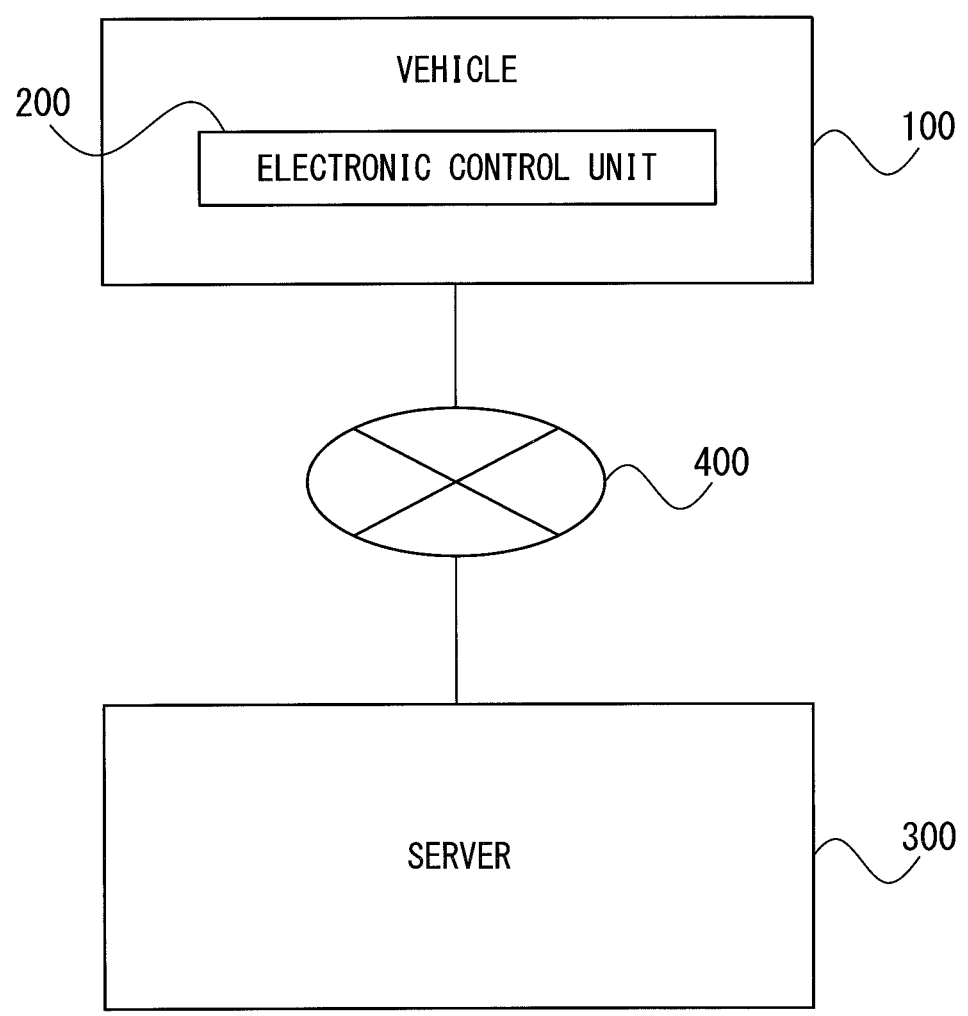
FIG. 12 is a block diagram schematically showing the configuration of a vehicle and a control device controlling the vehicle according to a fifth embodiment of the present disclosure.

FIG. 12 is a block diagram schematically showing the configuration of a vehicle 100 and a control device controlling the vehicle 100 according to the fifth embodiment of the present disclosure.

The configuration of the vehicle 100 according to the present embodiment is similar to the first embodiment, but, as shown in FIG. 11, in the present embodiment, the control device for controlling the vehicle 100 is comprised of an electronic control unit 200 and a server 300. The electronic control unit 200 and the server 300 can communicate with each other through a network 400. Note that, the server 300 can communicate not only with the vehicle 100, but also with a plurality of other vehicles.

The server 300 is provided with a communication interface, a central processing unit (CPU), a memory such as a random access memory (RAM), a hard disk drive, etc. The server 300 runs a program etc. stored in the hard disk drive to prepare a driving plan which had been prepared by the electronic control unit 200 in the first embodiment to the fourth embodiment instead of the electronic control unit 200 and transmits it to the electronic control unit 200.

By preparing the driving plan by the server 300 instead of the electronic control unit 200 in this way, it is possible to reduce the processing load of the electronic control unit 200 and in turn possible to reduce the manufacturing cost of the electronic control unit 200.

Above, embodiments of the present disclosure were explained, but the embodiments only show some of the examples of application of the present disclosure and are not meant to limit the technical scope of the present disclosure to a specific configuration of the above embodiments.

For example, in the embodiments, as the vehicle 100, a plug-in hybrid vehicle configured so that the battery 50 can be electrically connected to an external power supply was explained as an example, but it may also be a usual hybrid vehicle.

Further, in the above first embodiment, at step S17 of FIG. 2B, the driving routes up to the sort route number "k" were set to EV routes in which all of driving sections on the driving route are made EV sections, the driving routes from the sort route number k+1 to the sort route no. "n" are set to HV routes in which all of the driving sections on the driving route are made HV sections, and the driving routes are again rearranged in the order of the actual route nos. to prepare one second driving plan (route driving plan).

However, for example, in the following way, it is also possible to prepare a plurality of (number corresponding to sort route number "k") second driving plans (route driving plans) and employ as the second driving plan the one in which the second total fuel consumption TF2 becomes the smallest and compare the result with the first total fuel consumption TF1 of the first driving plan at step S20.

That is, if for example the sort route number "k" calculated at step S16 is 4, first, the driving route of the sort route no. 1 is set to an EV route in which all of the driving sections on the driving route are made EV sections, the driving routes from the sort route no. 2 to the sort route no. "n" are set to HV routes in which all driving sections on the driving route are made HV sections, and the driving routes are again rearranged in the order of the actual route nos. to thereby first prepare a first second driving plan.

Next, the driving routes up to the sort route no. 2 are set to EV routes in which all of the driving sections on the driving route are made EV sections, the driving routes from the sort route no. 3 to the sort route no. "n" are set to HV routes in which all of the driving sections on the driving route are made HV sections, and the driving routes are again rearranged in the order of the actual route nos. to prepare a second second driving plan.

Next, the driving routes up to the sort route no. 3 are set to EV routes in which all of the driving sections on the driving route are made EV sections, the driving routes up to the sort route no. 4 are set to HV routes in which all of the driving sections on the driving route are made HV sections, and the driving routes are again rearranged in the order of the actual route nos. to thereby prepare a third second driving plan.

Finally, the driving routes up to the sort route number "k" (=4) are set to EV routes in which all of the driving sections on the driving route are made EV sections, the driving routes from the sort route number k+1 (=5) to the sort route no. "n" are set to HV routes in which all of the driving sections on the driving route are made HV sections, and the driving routes are again rearranged in the order of the actual route nos. to thereby prepare a fourth second driving plan.

Further, it is also possible to respectively calculate the second total fuel consumptions TF2 of the second driving plans prepared in this way, employ the plan in which the second total fuel consumption TF2 becomes the smallest among them as the second driving plan, and compare this with the first total fuel consumption TF1 of the first driving plan at step S20.

Further, in the second embodiment and the third embodiment, at step S36 of FIG. 5B, the driving routes until the sort route number "k" were set to EV routes in which all of the driving sections on the driving route were made EV sections, in the driving sections on the driving routes from the sort route number k+1 to the sort route no. "n", the driving sections up to the second sort section no. "k" were set to EV sections (the third embodiment, IEV sections), the driving sections from the second sort section no. k+1 to the second sort section no. "n" were set to HV sections, and the driving sections were again rearranged in the order of the actual section nos. to thereby prepare one second driving plan (route priority driving plan).

However, for example, if at step S16 the sort route number "k" satisfying the inequality (2) is 2 or more, in the processing from step S31 to step S36, in the following way, it is also possible to prepare a plurality of (number corresponding to sort route number "k") second driving plans (route priority driving plans) and employ as the second driving plan the one in which the second total fuel consumption TF2 becomes the smallest and compare the result with the first total fuel consumption TF1 of the first driving plan at step S20.

Figure 13A:
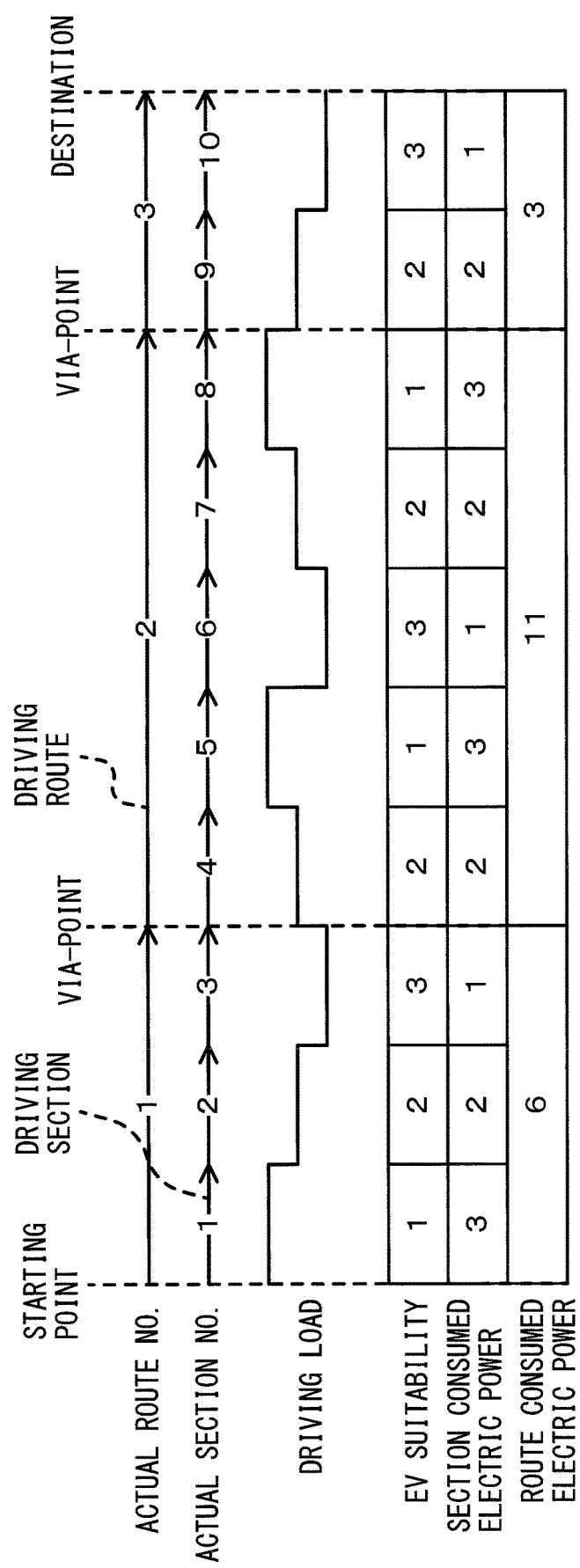
FIG. 13A is a view explaining the preparation of the second driving plan according to a modification of the present disclosure optimizing a plurality of trips.
Figure 13B:
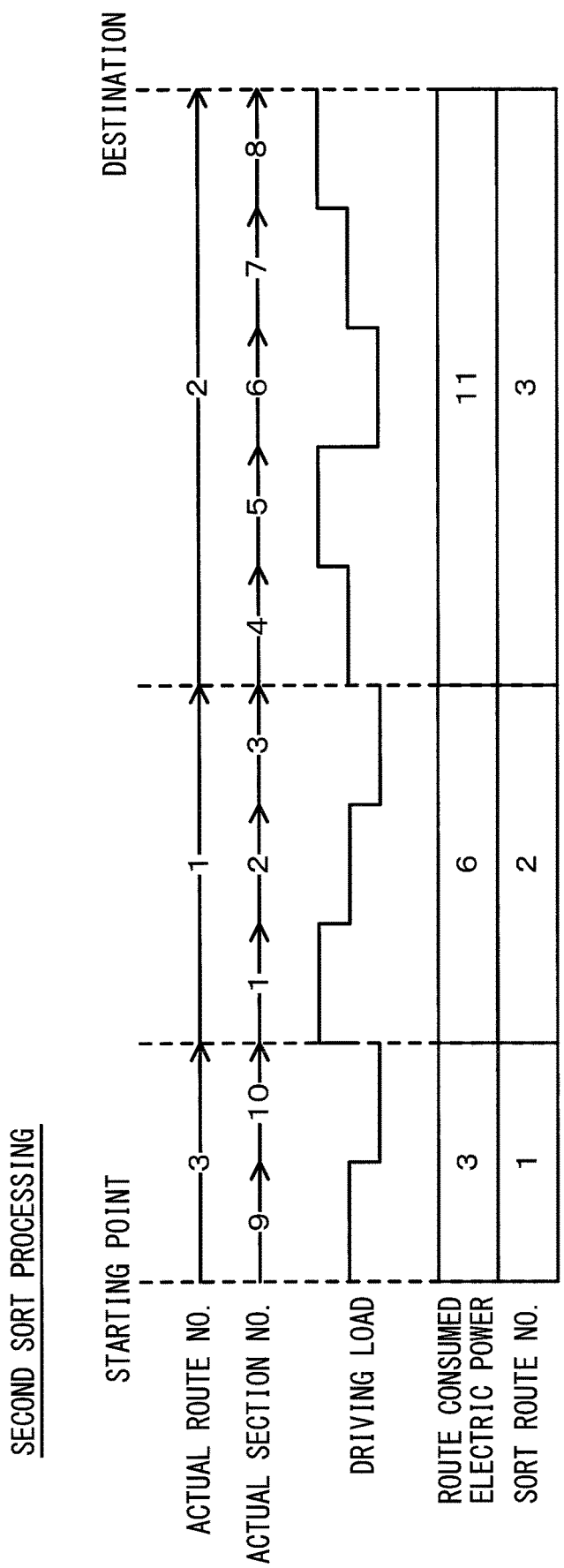
FIG. 13B is a view explaining the preparation of the second driving plan according to the modification of the present disclosure optimizing a plurality of trips.

For example as shown in FIG. 13A, when considering the case where there are three driving routes (that is, two via-points), if performing the second sort processing to rearrange the driving routes in the order of the smallest route consumed electric power up, the result becomes as shown in FIG. 13B.

Figure 13C:
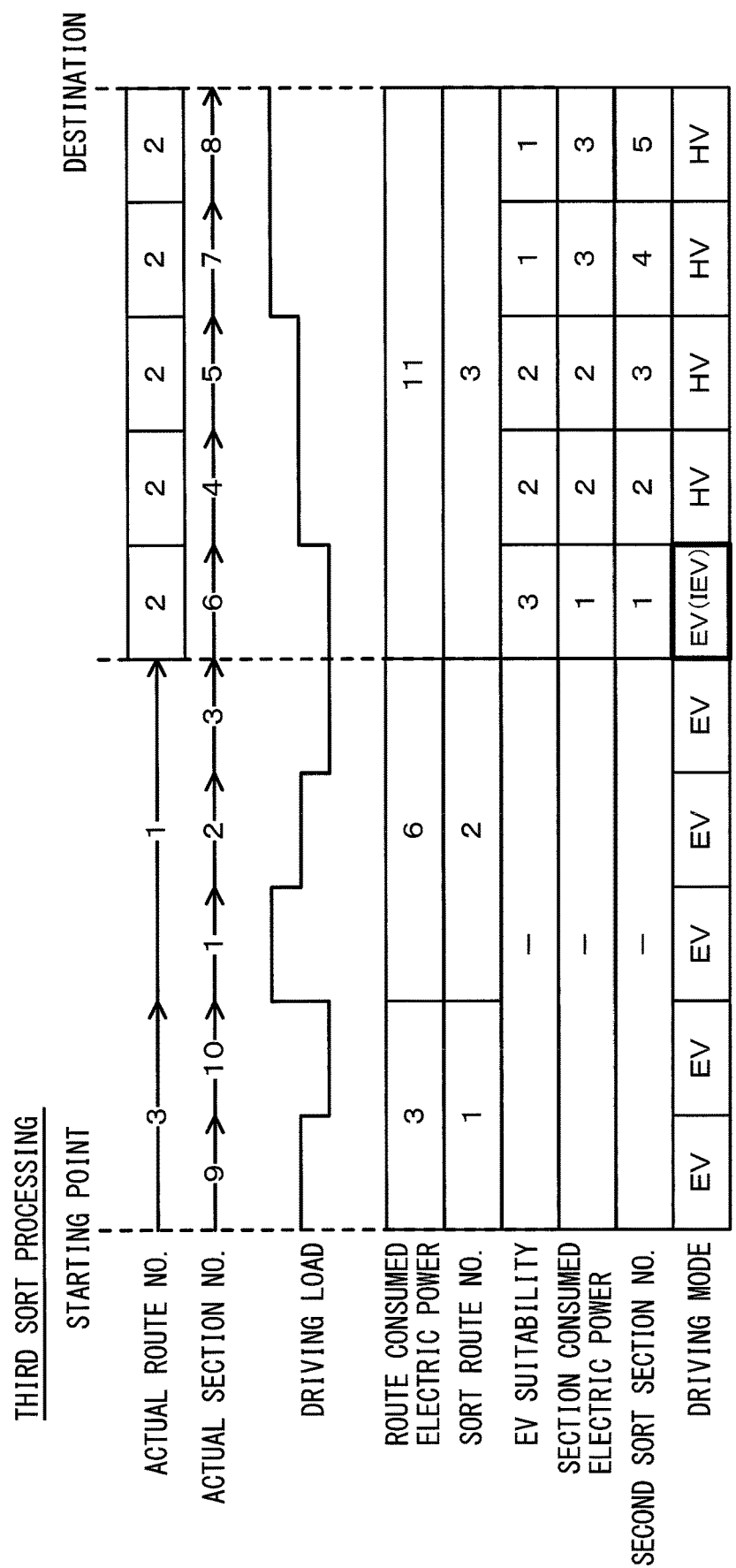
FIG. 13C is a view explaining the preparation of the second driving plan according to the modification of the present disclosure optimizing a plurality of trips.
Figure 13D:
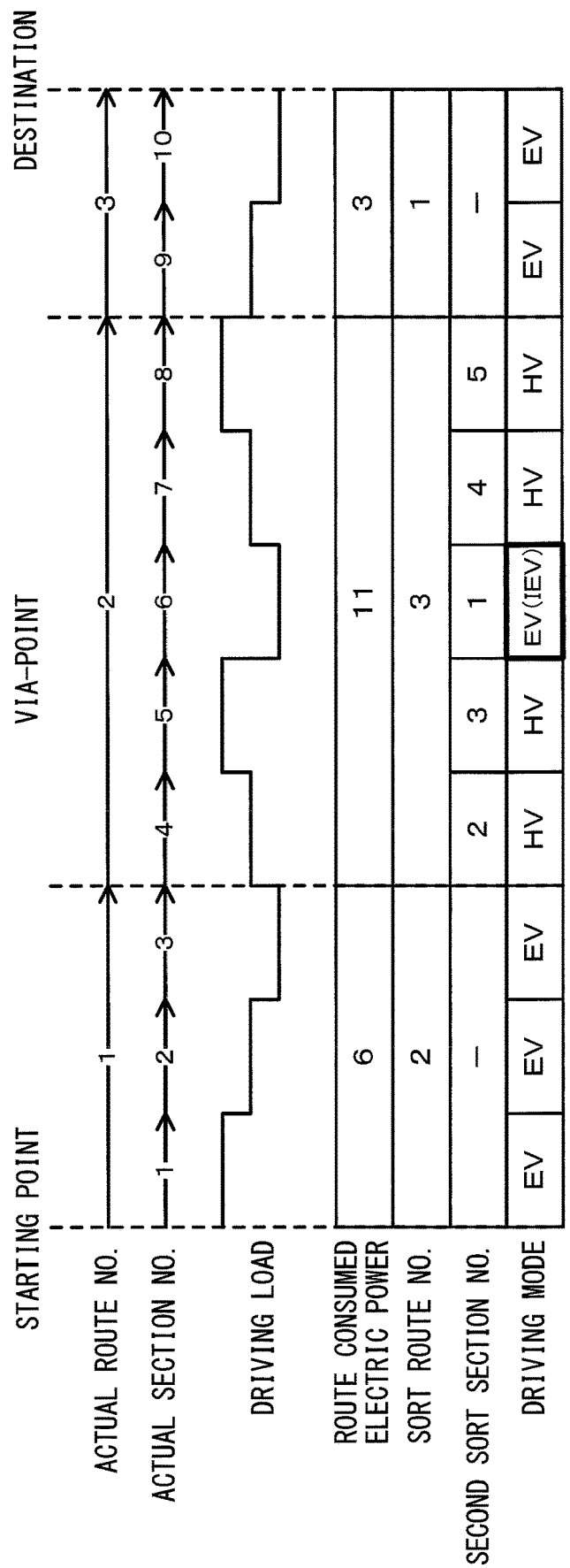
FIG. 13D is a view explaining the preparation of the second driving plan according to the modification of the present disclosure optimizing a plurality of trips.

At this time, for example, if the sort route number "k" satisfying the inequality (2) calculated at step S16 is 2, first, in the same way as the second embodiment and the third embodiment, as shown in FIG. 13C, the driving routes up to the sort route number "k" (in the example shown in FIG. 13C, k=2) are set to EV routes in which all of the driving sections in the driving route are made EV sections. Further, for the driving sections on the driving routes from the sort route number k+1 to the sort route no. "n", the driving sections up to the second sort section no. "k" (in the example shown in FIG. 13C, k=1) able to be set as EV sections considering the excess electric power $\Delta CE$ ($=CE\text{-}RE_2$) of the battery are set to EV sections (in the third embodiment, the IEV sections) and the driving sections from the second sort section no. k+1 to the second sort section no. "n" (in the example shown in FIG. 13C, n=5) are set to HV sections. Further, as shown in FIG. 13D, the driving sections are again rearranged in the order of the actual section nos. and the result set as the first second driving plan (route priority driving plan).

Figure 13E:
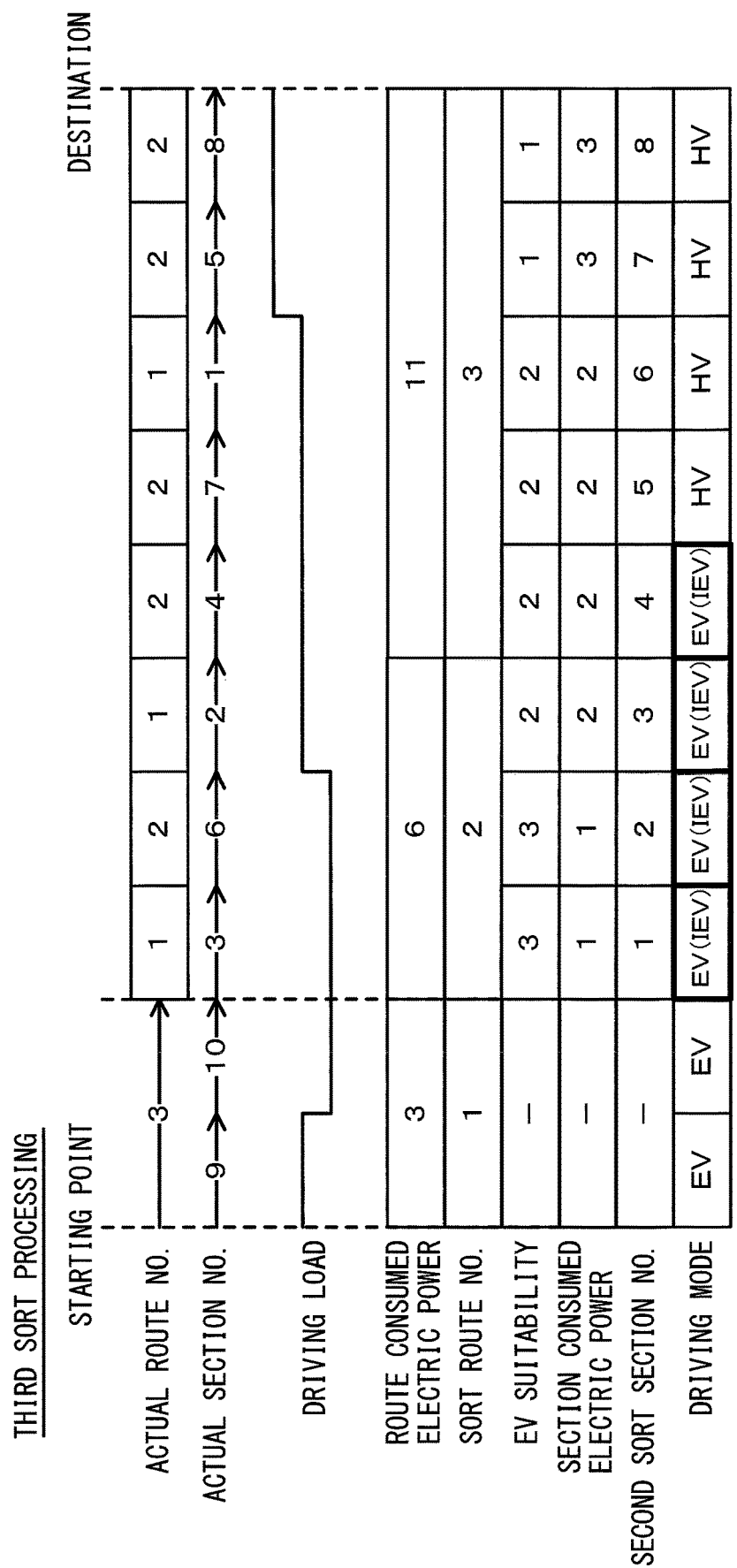
FIG. 13E is a view explaining the preparation of the second driving plan according to the modification of the present disclosure optimizing a plurality of trips.
Figure 13F:
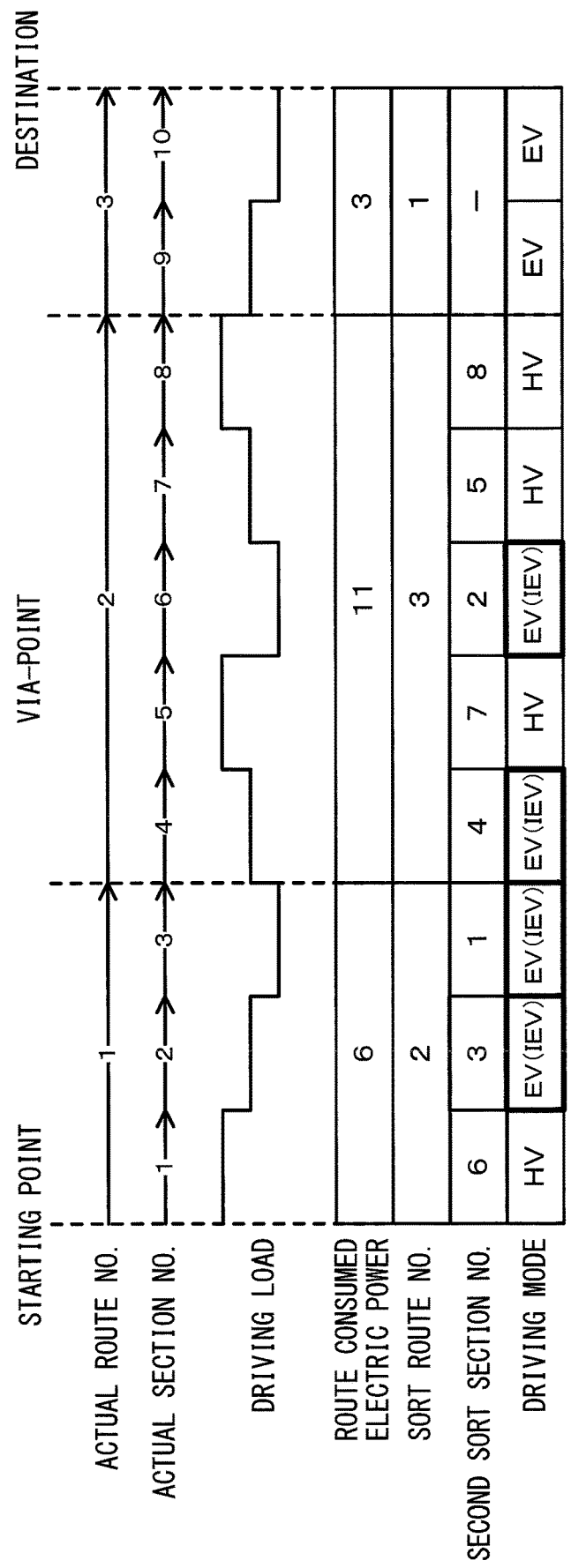
FIG. 13F is a view explaining the preparation of the second driving plan according to the modification of the present disclosure optimizing a plurality of trips.

Next, unlike the second embodiment and the third embodiment, as shown in FIG. 13E, the driving route of the sort route no. of 1 is set to an EV route in which all of the driving sections are made EV sections. Further, for the driving sections on the driving routes from the sort route no. 2 sort route no. "n", the driving sections up to the second sort section no. "k" (in the example shown in FIG. 13E, k=4) able to be set as EV sections considering the excess electric power $\Delta CE$ ($=CE\text{-}RE_1$) of the battery are set to EV sections (in the third embodiment, IEV sections) and the driving sections from the second sort section no. k+1 to the second sort section no. "n" (in the example shown in FIG. 13E, n=8) are set to HV sections. Further, as shown in FIG. 13F, the driving sections are again rearranged in the order of the actual section nos. and the result set as the second second driving plan (route priority driving plan).

Further, it is also possible to respectively calculate the second total fuel consumptions TF2 of the second driving plans prepared in this way, employ the plan in which the second total fuel consumption TF2 becomes the smallest among them as the second driving plan, and compare this with the first total fuel consumption TF1 of the first driving plan at step S20.

The invention claimed is:

1. A control device for a hybrid vehicle,
the hybrid vehicle comprising:
   an internal combustion engine;
   a battery that can be charged and discharged; and
   a rotary electric machine driven by electric power of the battery,
wherein the control device is configured to:
   prepare a driving plan setting one or more via-points on a projected route from a starting point to a destination to divide the projected route into a plurality of driving routes and divide each of the driving routes into a plurality of driving sections, and setting a driving mode from among an EV mode and an HV mode for the driving sections, wherein each of the one or more via-points is an end point of one trip between when a start switch of the hybrid vehicle is turned on and when it is turned off, and wherein the EV mode is for driving using electric power of the battery as the main power supply and the HV mode is for driving using the internal combustion engine as the main power supply;
   switch the driving modes in accordance with the driving plan; and
   prepare the driving plan setting the driving modes of all driving sections in at least one driving route at the EV mode.

2. The control device according to claim 1, wherein the control device is further configured to:
   calculate a route consumed electric power comprised of an estimated value of electric power consumed when driving over the driving routes by the EV mode;
   prepare a route driving plan;

set the driving modes of all driving sections in a driving route to the EV mode in order from the driving route with the small route consumed electric power up; and set the driving modes of all driving sections in a driving route to the HV mode from a driving route where an added value of the route consumed electric power added up in order from the driving route with the smallest route consumed electric power up exceeds the usable electric power of the battery.

3. The control device according to claim 2, wherein the control device is further configured to:

calculate suitabilities when driving on driving sections by the EV mode;

calculate section consumed electric power comprised of an estimated value of electric power consumed when driving on driving sections by the EV mode;

prepare a section driving plan;

set the driving modes to the EV mode in order from the driving section with the highest suitability down and smallest section consumed electric power up;

set the driving modes to the HV mode from a driving section where an added value of the section consumed electric power added up in order from the driving section with the highest suitability down and the smallest section consumed electric power up exceeds the usable electric power of the battery; and switch the driving modes in accordance with the route driving plan when the amount of the first total fuel consumption comprised of the total of the amounts of fuel consumed in driving routes in which there are driving sections set to the HV mode in the section driving plan is greater than the amount of the second total fuel consumption comprised of the total of the amounts of fuel consumed in driving routes in which all driving sections are set to the HV mode in the route driving plan.

4. The control device according to claim 3, wherein the amount of the first total fuel consumption and the amount of the second total fuel consumption are respectively totals of the amount of fuel consumed for driving and the amount of fuel consumed for warming up an exhaust purification catalyst of the internal combustion engine.

5. The control device according to claim 1, wherein the control device is further configured to:

calculate suitabilities when driving on driving sections by the EV mode;

calculate section consumed electric power comprised of an estimated value of electric power consumed when driving on driving sections by the EV mode;

calculate the route consumed electric power comprised of an estimated value of electric power consumed when driving over driving routes by the EV mode;

prepare a route priority driving plan;

set the driving routes up to when a first added value obtained by adding the route consumed electric power in order from the driving route with the smallest route consumed electric power up exceeds the usable electric power of the battery to EV routes in which driving modes of all driving sections in that driving route are made the EV mode in the order from the driving route with the smallest route consumed electric power up;

set the driving sections of driving routes in which the first added value exceeds the usable electric power of the battery up to where the second added value obtained by adding the section consumed electric power in order from the driving section with the highest suitability down and smallest section consumed electric power up in that driving route exceeds the excess electric power of the battery comprised of the usable electric power of the battery minus the total value of the route consumed electric power of the EV route to the EV mode; and set the driving mode to the HV mode from the driving section in which the second added value exceeds the excess electric power of the battery.

6. The control device according to claim 5, wherein the control device is further configured to:

prepare a section driving plan;

set the driving modes to the EV mode in order from a driving section with the highest suitability down and smallest section consumed electric power up;

set the driving modes to the HV mode from a driving section in which a third added value obtained by adding the section consumed electric power in order from the driving section with the highest suitability down and smallest section consumed electric power exceeds the usable electric power of the battery; and switch the driving modes in accordance with the route priority driving plan when the amount of the first total fuel consumption comprised of the total of the amounts of fuel consumed in driving routes in which there are driving sections set to the HV mode in the section driving plan is greater than the amount of the second total fuel consumption comprised of the total of the amounts of fuel consumed in driving routes in which there are driving sections set to the HV mode in the route priority driving plan.

7. The control device according to claim 5, wherein the control device is further configured to perform catalyst temperature rise control making the temperature of the exhaust purification catalyst rise when the temperature of the exhaust purification catalyst becomes less than a predetermined temperature rise reference temperature higher than the activation temperature where the exhaust purification function of the exhaust purification catalyst is activated in the case of switching the driving modes in accordance with the route priority driving plan when driving along a driving section on a driving route other than an EV route and set to an EV section driven over by the EV mode if already warming up the exhaust purification catalyst of the internal combustion engine on that driving route and there is an HV section driven over by the HV mode in the remaining driving sections on the driving route.

8. The control device according to claim 7, wherein the catalyst temperature rise control is a control for making the internal combustion engine operate for exactly a predetermined time when driving over a driving section on a driving route other than the EV route and setting to the EV section.

9. The control device according to claim 7, wherein the catalyst temperature rise control is control for supplying electric power to a substrate carrying the exhaust purification catalyst on a surface to heat the substrate for exactly a predetermined time when driving over a driving section on a driving route other than the EV route and setting to the EV section.

* * * * *